US009480379B2

(12) United States Patent
Yoon et al.

(10) Patent No.: US 9,480,379 B2
(45) Date of Patent: *Nov. 1, 2016

(54) ROBOT CLEANER AND CONTROL METHOD FOR THE SAME

(71) Applicant: SAMSUNG ELECTRONICS CO., LTD., Suwon-si (KR)

(72) Inventors: Sang Sik Yoon, Suwon-si (KR); Byung Chan Kim, Yongin-si (KR); Jun Hwa Lee, Suwon-si (KR); Jae Young Jung, Suwon-si (KR); Hee Won Jin, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 701 days.

This patent is subject to a terminal disclaimer.

(21) Appl. No.: 13/652,867

(22) Filed: Oct. 16, 2012

(65) Prior Publication Data

US 2013/0098401 A1    Apr. 25, 2013

(30) Foreign Application Priority Data

Oct. 21, 2011   (KR) .......................... 10-2011-0108221
Mar. 5, 2012    (KR) .......................... 10-2012-0022470

(51) Int. Cl.
*A47L 9/28*      (2006.01)
*A47L 11/33*     (2006.01)
*A47L 9/04*      (2006.01)
*A47L 11/40*     (2006.01)

(52) U.S. Cl.
CPC .............. *A47L 11/33* (2013.01); *A47L 9/0488* (2013.01); *A47L 11/4055* (2013.01); *A47L 2201/02* (2013.01); *A47L 2201/022* (2013.01); *A47L 2201/04* (2013.01)

(58) Field of Classification Search
CPC ............. A47L 9/0488; A47L 11/4055; A47L 2201/022; A47L 2201/04; A47L 2201/06
USPC ................................ 15/319, 339, 340.3, 385
IPC .......................................................... A47L 9/28
See application file for complete search history.

(56) References Cited

U.S. PATENT DOCUMENTS 7,332,890 B2*    2/2008  Cohen et al. ................. 320/109
2001/0004719 A1*  6/2001  Sommer ....................... 701/23

FOREIGN PATENT DOCUMENTS

EP      2 583 605 A2     4/2013
JP         62-292124    12/1987
KR    10-2007-0107956   11/2007

(Continued)

OTHER PUBLICATIONS

European Search Report dated Apr. 11, 2016 issued in corresponding European Patent Application 12189254.1.

(Continued)

*Primary Examiner* — David Redding
(74) *Attorney, Agent, or Firm* — Staas & Halsey LLP

(57) ABSTRACT

A robot cleaner includes a body to travel on a floor, an obstacle sensing unit to sense an obstacle approaching the body, an auxiliary cleaning unit mounted to a bottom of the body, to be extendable and retractable, and a control unit to control extension or retraction of the auxiliary cleaning unit when the obstacle is sensed. The control unit recognizes a zone of a charger and performs a control operation to prevent the auxiliary cleaning unit from extending in the charger zone.

15 Claims, 21 Drawing Sheets

(56) References Cited

FOREIGN PATENT DOCUMENTS

| KR | 1 921 523 A2 | 5/2008 |
| WO | 03/024292 A2 | 3/2003 |

OTHER PUBLICATIONS

Chinese Office Action dated Aug. 11, 2016 from Chinese Patent Application No. 201210401150.4, 10 pages.

* cited by examiner

ROBOT CLEANER AND CONTROL METHOD FOR THE SAME

CROSS-REFERENCE TO RELATED APPLICATIONS

This application claims the benefit of Korean Patent Application Nos. 10-2011-108221 and 10-2012-22470, respectively filed on Oct. 21, 2011 and Mar. 5, 2012 in the Korean Intellectual Property Office, the disclosures of which are incorporated herein by reference.

BACKGROUND

1. Field

Embodiments of the present disclosure relate to a robot cleaner and a control method for the same, which are capable of automatically cleaning a region to be cleaned by removing dust or the like from a floor of the cleaning region while traveling about the cleaning region.

2. Description of the Related Art

A robot cleaner is a device for automatically cleaning a region to be cleaned by sucking foreign matter such as dust from a floor of the cleaning region while autonomously traveling about the cleaning region without user control. Such a robot cleaner not only includes a main brush to remove dust or the like accumulated on a region beneath a body of the robot cleaner, but also includes an auxiliary cleaning tool to achieve an enhancement in cleaning performance in a region adjacent to a wall.

Such an auxiliary cleaning tool is outwardly protruded from an inside of the robot cleaner body, to sweep dust on a floor, in particular, dust in a region adjacent to a wall. Although such an auxiliary cleaning tool achieves an enhancement in cleaning performance in a region adjacent to a wall, there may be a problem in that the auxiliary cleaning tool has an increased possibility of striking the wall because it is outwardly protruded from the robot cleaner body.

In particular, in a conventional robot cleaner system, the robot cleaner thereof may not discriminate an additional device included in the robot cleaner system, for example, a charger or a virtual obstacle zone forming device, from obstacles. In this case, the robot cleaner may approach the additional device of the robot cleaner system and, as such, the auxiliary cleaning tool thereof may extend. As a result, the auxiliary cleaning tool may strike the additional device, thereby shifting the position of the additional device or damaging the additional device. To this end, it may be necessary to provide a robot cleaner capable of discriminating the additional device of the robot cleaner system from obstacles.

SUMMARY

Therefore, it is an aspect of the present disclosure to provide a robot cleaner and a control method for the same, which are capable of performing a control operation such that, although an obstacle on a travel path is sensed, the auxiliary cleaning unit of the robot cleaner does not extend when the sensed obstacle is a zone of an additional device constituting a robot cleaner system.

Additional aspects of the disclosure will be set forth in part in the description which follows and, in part, will be apparent from the description, or may be learned by practice of the disclosure.

In accordance with one aspect of the present disclosure, a robot cleaner includes a body to travel on a floor, an obstacle sensing unit to sense an obstacle approaching the body, an auxiliary cleaning unit mounted to a bottom of the body, to be extendable and retractable, and a control unit to control extension or retraction of the auxiliary cleaning unit when the obstacle is sensed. The control unit may recognize a zone of a charger and perform a control operation to prevent the auxiliary cleaning unit from extending in the charger zone.

The control unit may create and store a cleaning region map including information about a travel path of the body.

The control unit may designate a start position of the travel path of the body to a position of the charger in the cleaning region map, recognize the charger zone based on the charger position designated in the cleaning region map, and perform a control operation to cause the body to travel while bypassing the charger zone.

The control unit may determine a charging state of the body.

The control unit may determine that the body is positioned at the charger zone when the body is in a charging state.

The controller may determine that the body is positioned at the charger zone for a predetermined time, when the body travels backward after completion of charging.

The robot cleaner may further include a signal sensing unit to sense a signal transmitted from the charger. The control unit may recognize the charger zone based on the signal, and perform a control operation to cause the body to travel while bypassing the charger zone.

The signal may be a signal to guide travel of the body toward the charger, for docking of the body with the charger.

The signal may include at least one of an infrared signal, an ultrasonic signal and a laser signal, which are forwardly or laterally transmitted from the charger within a predetermined angular range.

The signal may be divided into two signals, which overlap each other and have different ranges or different intensities.

The signal may form, as the charger zone, a zone having a predetermined curved surface at a front or lateral side of the charger.

The signal may include at least one of an infrared signal, an ultrasonic wave signal and a laser signal, each of which forms a signal zone having a predetermined curved surface at the front or lateral side of the charger.

The signal may be divided into two signals, which overlap each other and have different ranges or different intensities.

The control unit may determine that the body is positioned at the charger zone, when the signal is sensed in a stopped state of the body.

The control unit may create and store a cleaning region map including information about a travel path of the body, designate a position, from which the signal is transmitted, to a position of the charger in the cleaning region map, recognize the charger zone based on the charger position designated in the cleaning region map, and perform a control operation to cause the body to travel while bypassing the charger zone.

In accordance with another aspect of the present disclosure, a robot cleaner includes a body to travel on a floor, an obstacle sensing unit to sense an obstacle approaching the body, an auxiliary cleaning unit mounted to a bottom of the body, to be extendable and retractable, and a control unit to control extension or retraction of the auxiliary cleaning unit when the obstacle is sensed. The control unit may recognize an extension prevention zone and perform a control operation to prevent the auxiliary cleaning unit from extending in the extension prevention zone.

The robot cleaner may further include a signal sensing unit to sense a signal transmitted from an extension prevention signal generating unit. The control unit may recognize the extension prevention zone based on the signal. The extension prevention zone may be formed by the signal transmitted from the extension prevention signal generating unit.

The signal may form a virtual obstacle zone extending from the extension prevention signal generating unit in one direction while having a predetermined size. The control unit may perform a control operation to cause the body to travel while bypassing the virtual obstacle zone.

The signal may form a rectilinear virtual wall zone having a predetermined thickness and a predetermined length.

The signal may include at least one of an infrared signal, an ultrasonic wave signal and a laser signal, which are transmitted from the extension prevention signal generating unit in one direction within a predetermined angular range.

The signal may form a virtual obstacle zone having a predetermined curved surface around the extension prevention signal generating unit. The control unit may perform a control operation to cause the body to travel while bypassing the virtual obstacle zone.

The signal may include at least one of an infrared signal, an ultrasonic wave signal and a laser signal, each of which forms a signal zone having a predetermined curved surface at the front or lateral side of the charger.

The robot cleaner may further include a signal sensing unit to sense a magnetic field signal. The control unit may recognize the extension prevention zone based on the magnetic field signal. The extension prevention zone may be a magnetic field zone formed by a magnetic belt installed on the floor.

The control unit may perform a control operation to cause the body to travel while bypassing the magnetic field zone.

In accordance with another aspect of the present disclosure, a control method for a robot cleaner including a body to travel on a floor, an obstacle sensing unit to sense an obstacle approaching the body, and an auxiliary cleaning unit mounted to a bottom of the body, to be extendable and retractable includes controlling the body to clean the floor while traveling on the floor, sensing an obstacle on a travel path of the body, and controlling the auxiliary cleaning unit to extend or retract when the obstacle is sensed, recognizing a zone of a charger, and controlling the auxiliary cleaning unit to be prevented from extending in the charger zone upon recognition of the charger zone.

The recognizing the charger zone may include designating a start position of the travel path of the body to a position of the charger in a cleaning region map including information about the travel path of the body, and recognizing the charger position designated in the cleaning region map as the charger zone.

The recognizing the charger zone may include sensing a charging state of the body, and determining that the body is positioned at the charger zone, when the body is in a charging state.

The recognizing the charger zone may include sensing a charging completion state of the body, and determining that the body is positioned at the charger zone for a predetermined time, when the body travels backward after completion of charging.

The recognizing the charger zone may include sensing a signal transmitted from the charger, and recognizing the charger zone based on the sensed signal.

The signal may be a signal to guide travel of the body toward the charger, for docking of the body with the charger or a signal to form, as the charger zone, a zone having a predetermined curved surface at a front or lateral side of the charger.

The recognizing the charger zone may include determining that the body is positioned at the charger zone, when the signal is sensed in a stopped state of the body.

The recognizing the charger zone may include designating a position, from which the signal is transmitted, to a position of the charger in a cleaning region map including information about a travel path of the body, and recognizing the charger zone based on the charger position designated in the cleaning region map.

In accordance with still another aspect of the present disclosure, a control method for a robot cleaner including a body to travel on a floor, an obstacle sensing unit to sense an obstacle approaching the body, and an auxiliary cleaning unit mounted to a bottom of the body, to be extendable and retractable includes controlling the body to clean the floor while traveling on the floor, sensing an obstacle on a travel path of the body, and controlling the auxiliary cleaning unit to extend or retract when the obstacle is sensed, recognizing an extension prevention zone, and controlling the auxiliary cleaning unit to be prevented from extending in the extension prevention zone upon recognition of the extension prevention zone.

The recognizing the extension prevention zone may include sensing a signal transmitted from an extension prevention signal generating unit, and recognizing the extension prevention zone based on the signal, and the extension prevention zone is formed by the signal transmitted from the extension prevention signal generating unit.

The signal may form a virtual obstacle zone extending from the extension prevention signal generating unit in one direction while having a predetermined size or a virtual obstacle zone having a predetermined curved surface around the extension prevention signal generating unit. The recognizing the extension prevention zone may include controlling the body to travel while bypassing the virtual obstacle zone.

The recognizing the extension prevention zone may include sensing a magnetic field signal, and recognizing the extension prevention zone based on the magnetic field signal. The extension prevention zone may be formed by a magnetic belt installed on the floor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings.

Figure 1:
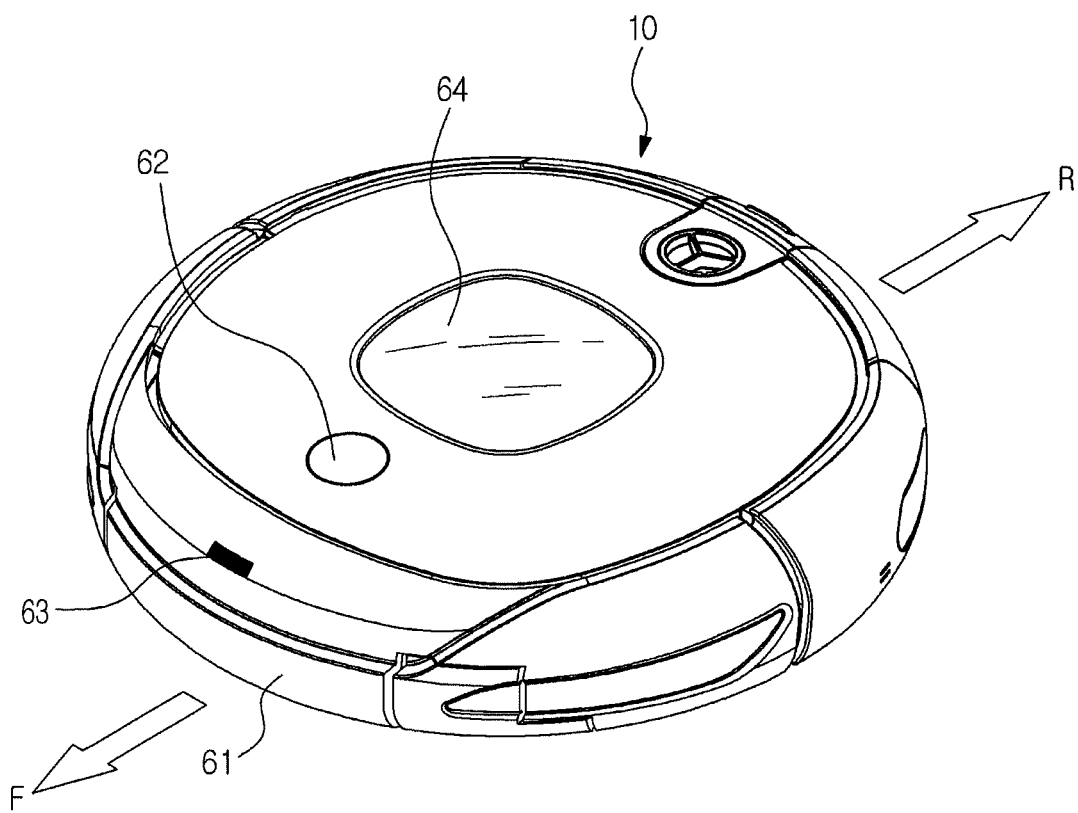
FIG. 1 is a view schematically illustrating an outer appearance of a robot cleaner according to an exemplary embodiment of the present disclosure.

FIG. 1 is a view schematically illustrating an outer appearance of a robot cleaner according to an exemplary embodiment of the present disclosure.

Referring to FIG. 1, the robot cleaner, which is designated by reference numeral "1", includes a body 10 to define an outer appearance of the robot cleaner 1.

Various sensors are mounted to the body 10, to sense an obstacle. The sensors may include a proximity sensor 61 and/or a vision sensor 62. For example, when the robot cleaner 1 travels in a random direction under the condition that there is no predetermined path, along which the robot cleaner 1 travels, that is, in a cleaning system having no map, the robot cleaner 1 may travel about a cleaning region and sense an obstacle, using the proximity sensor 61. On the other hand, when the robot cleaner 1 travels along a predetermined path, that is, in a cleaning system requiring a map, the vision sensor 62 may be installed to receive position information of the robot cleaner 1, and thus to create a map. The sensors may be implemented in various manners.

A signal sensor 63 may also be mounted to the body 10, to receive a signal from a charger or an exhaust station.

A display unit 64 is coupled to the body 10, to display various states of the robot cleaner 1. For example, the display unit 64 may display a charged state of the battery, whether or not the dust collector 55 is full of dust, a cleaning mode of the robot cleaner 1, etc.

Configurations of the auxiliary cleaning units 21 and 22 will be described in more detail with reference to FIGS. 3 to 6.

Figure 2:
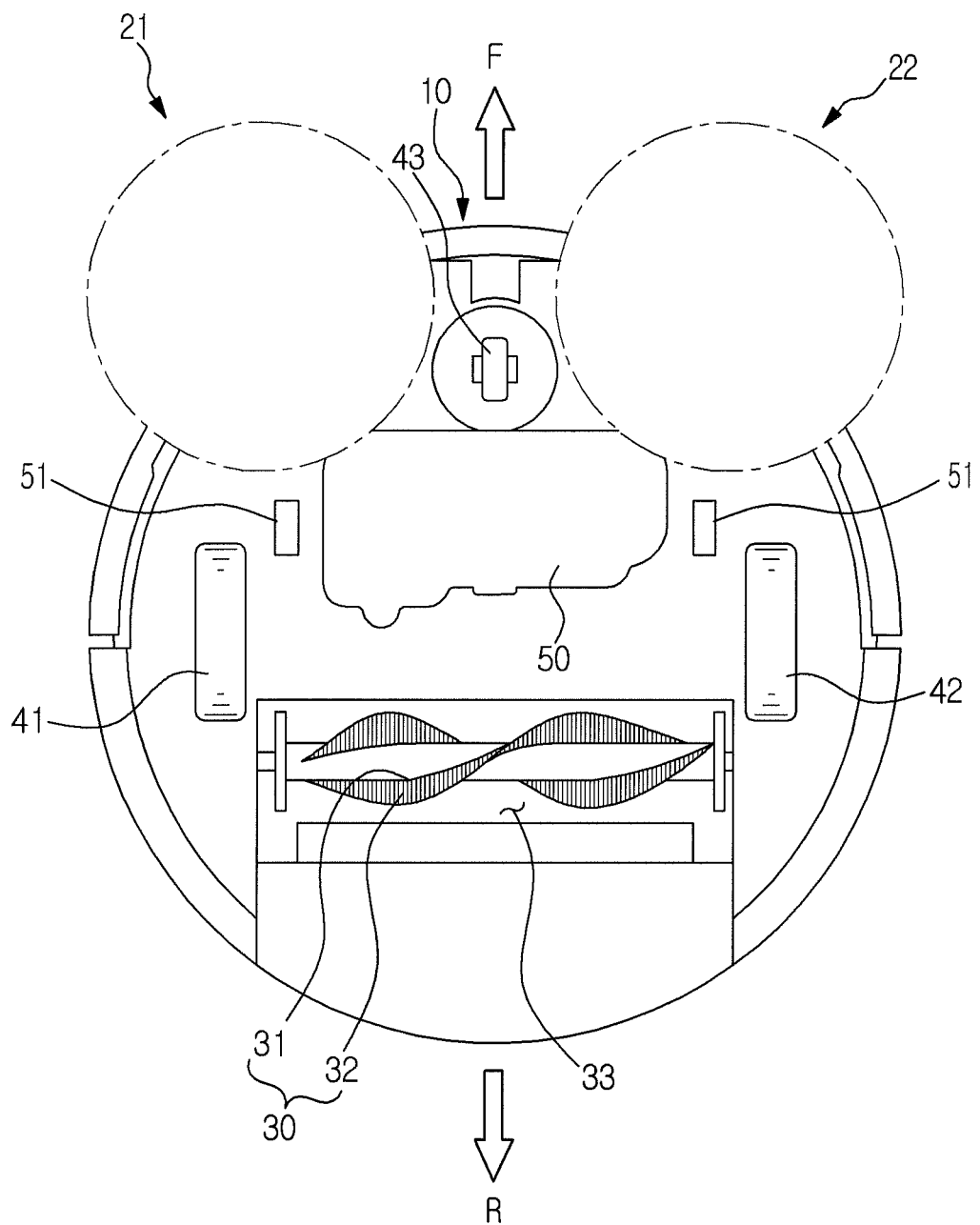
FIG. 2 is a bottom view schematically illustrating a configuration of the robot cleaner shown in FIG. 1.

FIG. 2 is a bottom view schematically illustrating a configuration of the robot cleaner shown in FIG. 1.

Referring to FIGS. 1 and 2, the robot cleaner 1 includes a main brush unit 30, a power supply 50, drive wheels 41 and 42, a caster 43, and the auxiliary cleaning units 21 and 22.

The main brush unit 30 is mounted at an opening formed at a portion of the bottom of the body 10 biased from a central region of the body 10 in a rearward direction R. The main brush unit 30 sweeps dust accumulated on the floor, on which the body 10 is disposed, such that the swept dust is guided to a dust inlet 33. The opening of the bottom of the body 10, at which the main brush unit 30 is mounted, functions as the dust inlet 33.

The main brush unit 30 includes a roller 31, and a main brush 32 stuck in an outer surface of the roller 31. As the roller 31 rotates, the main brush 32 sweeps dust accumulated on the floor such that the swept dust is guided to the dust inlet 33.

Although not shown in FIG. 2, a fan unit to generate suction force is provided within the dust inlet 33. The fan unit functions to move dust introduced into the dust inlet 33 to a dust collector.

The power supply 50 supplies drive power to drive the body 10. The power supply 50 includes a battery electrically connected to the body 10 and drivers to drive various elements mounted to the body 10, to supply drive power to the body 10 and drivers. The battery is constituted by a rechargeable secondary battery. When the body 10 is coupled to a charger or an exhaust station after completing a cleaning operation, the battery receives electric power from the charger or exhaust station, to be charged.

The drive wheels 41 and 42 are centrally arranged at opposite sides of the bottom of the body 10 in a symmetrical manner, respectively. The drive wheels 41 and 42 may perform movement operations including forward movement, backward movement, and rotation during cleaning.

The caster 43 is installed at a front edge portion of the bottom of the body 10 when viewed on the basis of a travel direction. The caster 43 enables the body 10 to maintain a stable posture. The drive wheels 41 and 42, and caster 43 may be configured into a single assembly detachably mounted to the body 10.

Openings are formed at opposite sides of a front portion of the body 10 when viewed on the basis of a forward direction F, respectively. The auxiliary cleaning units 21 and 22 are installed to cover the openings, respectively.

Figure 3:
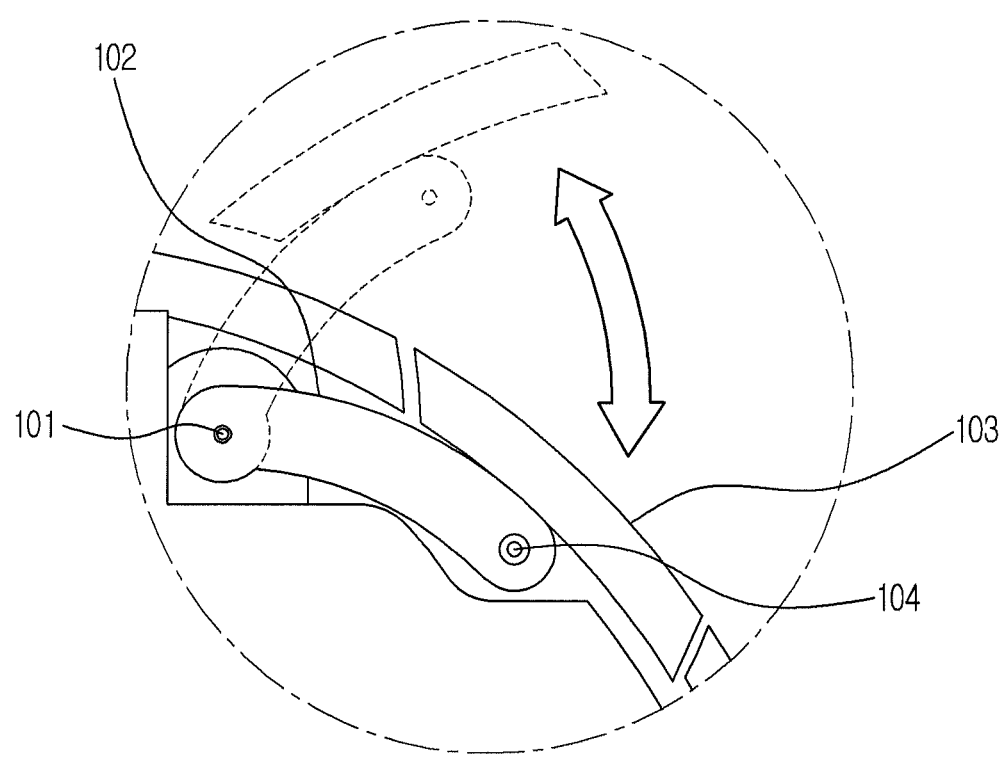
FIG. 3 is a view schematically illustrating a configuration for extending or retracting auxiliary cleaning units in accordance with an embodiment of the present disclosure.

FIG. 3 is a view schematically illustrating a configuration for extending or retracting the auxiliary cleaning units in accordance with an embodiment of the present disclosure.

Referring to FIG. 3, each of the auxiliary cleaning units 21 and 22 includes a side arm 102, a periphery cover 103, and an auxiliary cleaning tool 110.

The side arm 102 is coupled to a front portion of the bottom of the body 10 at one side of the body 10. An arm motor (not shown) is received in the body 10 over the side arm 102, to drive the side arm 102. The arm motor is connected to a rotation shaft (not shown) via gears to transmit drive force to the side arm 102. The rotation shaft is mounted to a coupling groove 101 formed at one end of the side arm 102.

When the arm motor is driven, the rotation shaft is rotated, thereby causing the side arm 102 to pivot about the coupling groove 101. In this case, the side arm 102 pivots outwardly of the body 10. In this state, the periphery cover 103 no longer covers the opening of the body 10. That is, the periphery cover 103 no longer forms the periphery of the body 10.

A coupling groove 104, to which the auxiliary cleaning tool 110 is coupled, is formed at the other end of the side arm 102. A rotation motor (not shown) is received in the body 10 over the coupling groove 104, to drive the auxiliary cleaning tool 110. The auxiliary cleaning tool 110 is rotated about the coupling groove 104 by drive force of the rotation motor.

Figure 4:
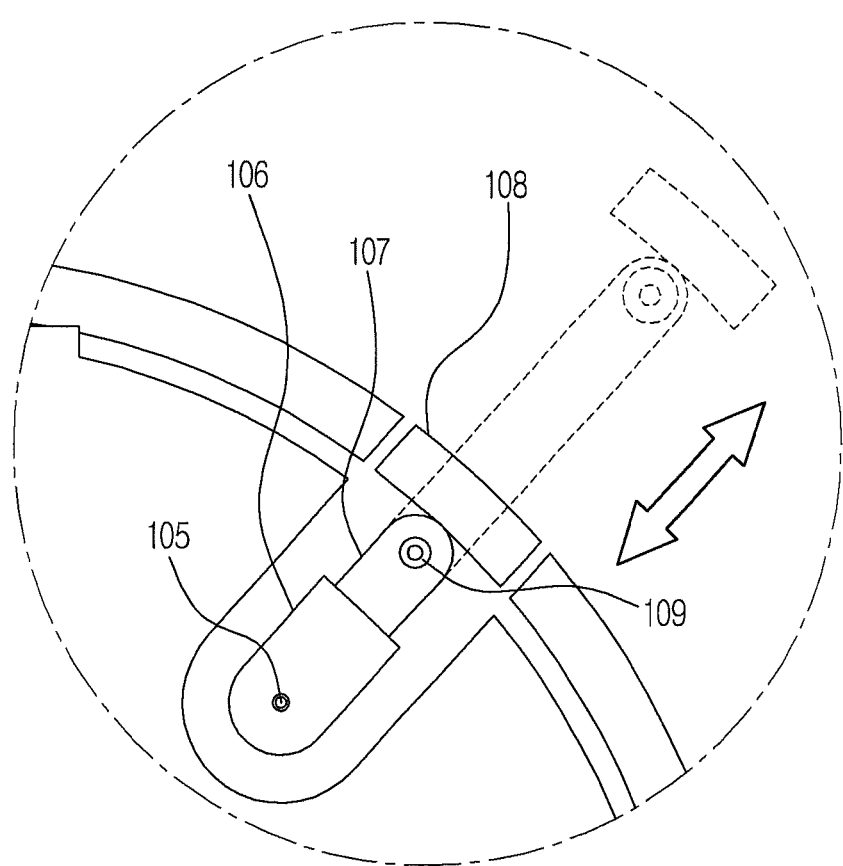
FIG. 4 is a view schematically illustrating a configuration for extending or retracting the auxiliary cleaning units in accordance with another embodiment of the present disclosure.

FIG. 4 is a view schematically illustrating a configuration for extending or retracting the auxiliary cleaning units in accordance with another embodiment of the present disclosure.

Referring to FIG. 4, each of the auxiliary cleaning units 21 and 22 includes a side arm 106, a periphery cover 108, and an auxiliary cleaning tool 110.

The side arm 106 is coupled to a front portion of the bottom of the body 10 at one side of the body 10 via a coupling groove 105. An extension arm 107 is received in the side arm 106 such that it is extendable outwardly of the side arm 106 in a sliding manner.

The extension arm 107 moves forward and rearward within the side arm 106 in a longitudinal direction of the side arm 106. To this end, a rail is formed within the side arm 106, and a guide (not shown), which is engaged with the rail, is formed at the extension arm 107. Accordingly, the extension arm 107 may slidably move along the rail in a state of being coupled to the rail. Another extension arm may be received in the extension arm 107 such that it is extendable outwardly of the extension arm 107 in a sliding manner. Meanwhile, movement of the another extension arm may be carried out in the same manner as described above. There is no limitation as to the number of extension arms.

An arm motor (not shown) is received in the body 10 over the side arm 106, to drive the extension arm 107. The arm motor transmits drive force to the extension arm 107 via gears. When the arm motor is driven, the extension arm 107 slides outwardly of the side arm 106, to extend outwardly of the body 10. In this state, the periphery cover 108 no longer covers the opening of the body 10. That is, the periphery cover 108 no longer forms the periphery of the body 10.

A coupling groove 109, to which the auxiliary cleaning tool 110 is coupled, is formed at one end of the extension arm 107. A rotation motor (not shown) is received in the body over the coupling groove 109, to drive the auxiliary cleaning tool 110. The auxiliary cleaning tool 110 is rotated about the coupling groove 109 by drive force of the rotation motor.

Figure 5:
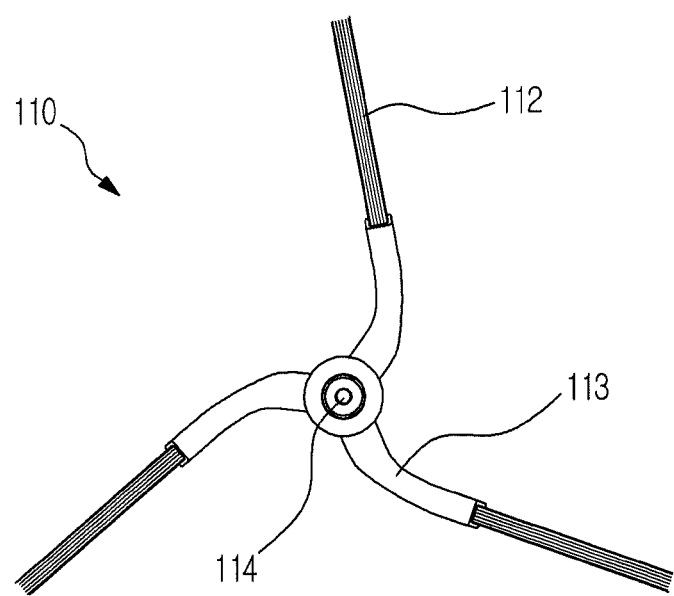
FIG. 5 is a view schematically illustrating a configuration of an auxiliary cleaning tool according to an exemplary embodiment of the present disclosure.

FIG. 5 is a view schematically illustrating a configuration of the auxiliary cleaning tool according to an exemplary embodiment of the present disclosure.

Referring to FIG. 5, the auxiliary cleaning tool 110 includes brush arms 113 coupled to form a central common end such that they outwardly extend in a radial direction from the central common end while being spaced apart from one another in a circumferential direction. An auxiliary brush 112 is coupled to each brush arm 113. A rotation shaft 114 is formed at the central common end of the brush arms 113. The rotation shaft 114 extends to be coupled to the side arm 102 or extension arm 106 via the coupling groove 104 or 109. When the auxiliary cleaning tool 110 rotates, the auxiliary brush 112 sweeps dust accumulated on an area disposed adjacent to a wall toward the central region of the body 10 or disperses the dust.

Figure 6:
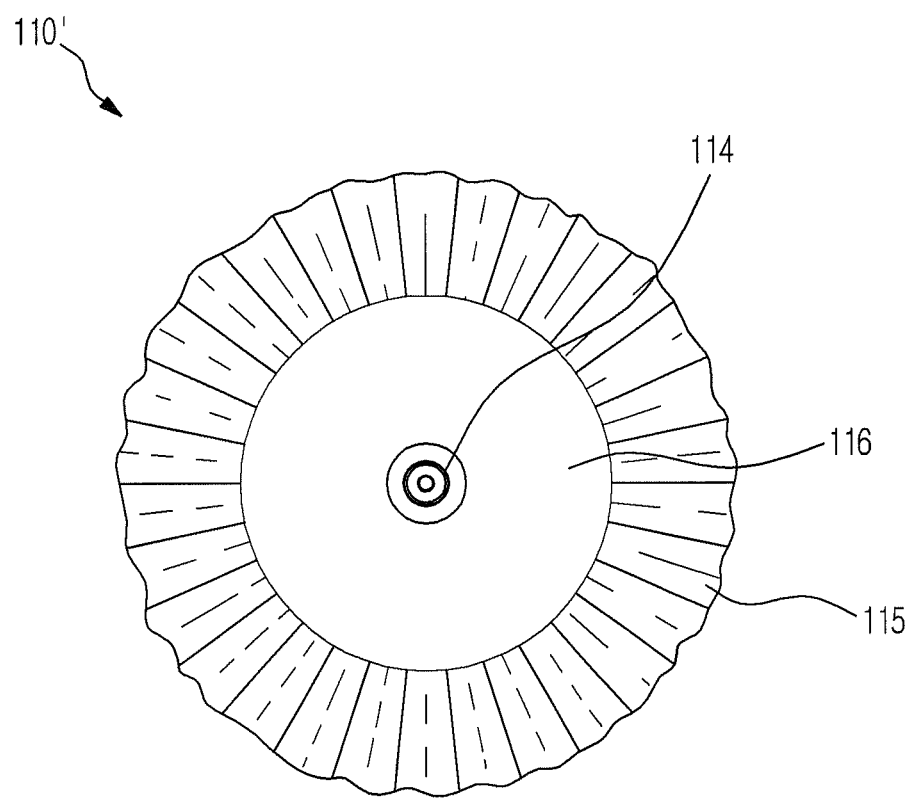
FIG. 6 is a view schematically illustrating a configuration of the auxiliary cleaning tool according to another embodiment of the present disclosure.

FIG. 6 is a view schematically illustrating a configuration of the auxiliary cleaning tool according to another embodiment of the present disclosure.

Referring to FIG. 6, the auxiliary cleaning tool 110' includes a circular floorcloth holder 116. An auxiliary floorcloth 115 is fitted around the floorcloth holder 116 in a radial direction. A rotation shaft 114 is formed at a center of the floorcloth holder 116 such that it axially extends. The rotation shaft 114 receives drive force from a rotation motor, to rotate the auxiliary cleaning tool 110'. The rotation shaft 114 is coupled to the side arm 102 or extension arm 106 via the coupling groove 104 or 109. When the auxiliary cleaning tool 110' rotates, the auxiliary floorcloth 115 scrubs an area disposed adjacent to a wall.

Meanwhile, the auxiliary brush 112 may be made of various materials having elasticity. The auxiliary floorcloth 115 may be made of a fiber material or various materials other than the fiber material.

The robot cleaner 1 according to the illustrated embodiment of the present disclosure may clean even an area of the floor disposed adjacent to a wall or a corner area of the floor because the effective cleaning region of the robot cleaner 1 is extended by virtue of the auxiliary cleaning units 21 and 22 outwardly extendable from the body 10.

In the following description, it is assumed that extension of each auxiliary cleaning unit 21 or 22 carried out during operation of the auxiliary cleaning unit 21 or 22 include both pivotal movement of the side arm 102 outwardly of the body 10 in the embodiment of FIG. 3 and extension of the extension arm 106 outwardly of the body 10 in the embodiment of FIG. 4, except for the case in which the extension of each auxiliary cleaning unit 21 or 22 is separately described in conjunction with pivotal movement of the side arm 102 or the extension of the extension arm 106. Also, it is assumed that the auxiliary cleaning tool 110 cleans an area of the floor disposed adjacent to a wall or a corner area of the floor while rotating during cleaning operation of the robot cleaner 1.

Figure 7:
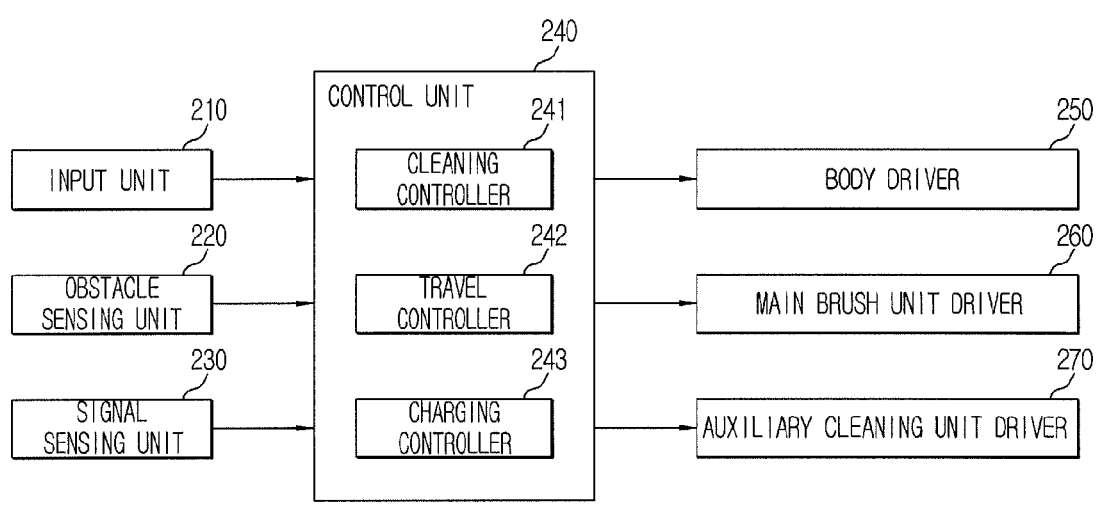
FIG. 7 is a block diagram schematically illustrating a control configuration of the robot cleaner according to an exemplary embodiment of the present disclosure.

FIG. 7 is a block diagram schematically illustrating a control configuration of the robot cleaner according to an exemplary embodiment of the present disclosure.

Referring to FIG. 7, the robot cleaner 1 includes an input unit 210, an obstacle sensing unit 220, a signal sensing unit 230, a control unit 240, a body driver 250, a main brush unit driver 260, and an auxiliary cleaning unit driver 270.

The input unit 210 receives a user's operation command from an operation panel provided at the body 10 or a remote controller. The user's operation command includes commands associated with travel, cleaning and charging operations of the robot cleaner 1. In particular, the user directly operates the remote controller, to input a command associated with, for example, protrusion of the auxiliary cleaning units 21 and 22.

The obstacle sensing unit 220 senses an obstacle approaching the body 10 during travel of the body 10. In more detail, the obstacle sensing unit 220 receives information as to obstacles from the proximity sensor 61 or vision sensor 62, and then senses an obstacle disposed around the body 10.

For example, the proximity sensor 61 may be implemented in the form of an ultrasonic sensor. In this case, the proximity sensor 61 may transmit an ultrasonic wave, and then receive an ultrasonic wave reflected from an obstacle, thereby sensing the obstacle. For this function, the proximity sensor 61 may take the form of a combination of at least one ultrasonic transmitter and at least one ultrasonic receiver installed around the periphery of the body 10. When the ultrasonic proximity sensor 61 further approaches an obstacle, it generates a signal having higher power because the intensity of an ultrasonic wave received by the ultrasonic proximity sensor 61 after being reflected from the obstacle increases. It may be possible to calculate the distance between the body 10 and the obstacle, based on the output signal from the proximity sensor 61.

Meanwhile, the vision sensor 62 acquires an image on the travel path of the body 10, and then senses an obstacle through processing of the acquired image. Practically, it may be possible to calculate the distance between the body 10 and the obstacle in the image processed by the vision sensor 62, based on three-dimensional coordinates.

The signal sensing unit 230 senses an identifying signal transmitted from the charger or formed around the charger in accordance with operation of the signal sensor 63.

The body driver 250 drives the drive wheels 41 and 42, to move the robot cleaner 1. In accordance with a control command from a travel controller 242, the body driver 250 controls the travel direction and travel speed of the robot cleaner 1.

The main brush unit driver 260 drives the roller 31 in accordance with a control command from a cleaning controller 241. In accordance with rotation of the roller 31, the main brush 32 sweeps dust accumulated on the floor.

The auxiliary cleaning unit driver 270 drives the arm motor in accordance with a control command from the cleaning controller 241, to perform extension or retraction of each auxiliary cleaning unit 21 or 22. The auxiliary cleaning unit driver 270 also adjusts an extension or retraction degree of each auxiliary cleaning unit 21 or 22 by adjusting the number of rotations of the arm motor in accordance with the distance between the body 10 and the obstacle. The auxiliary cleaning unit driver 270 also performs rotation of the auxiliary cleaning tool 110 and adjusts the rotation speed of the auxiliary cleaning tool 110, to cause the auxiliary brush 112 (or the rotation speed of the auxiliary cleaning tool 110', to cause auxiliary floorcloth 115) to clean an area disposed adjacent to a wall.

The control unit 240 controls the overall operation of the robot cleaner 1 in accordance with a control program. The control unit 240 mainly includes the cleaning controller 241, which controls cleaning operation of the robot cleaner 1, the travel controller 242, which controls travel of the robot cleaner 1, and a charging controller 243 to control charging operation of the robot cleaner 1.

The cleaning controller 241 not only controls operation of the main brush unit 30, but also determines whether each auxiliary cleaning unit 21 or 22 is to be extended or retracted. The cleaning controller 241 also controls an extension or retraction degree of each auxiliary cleaning unit 21 or 22. Also, the cleaning controller 241 determines an operation mode of the robot cleaner 1 among an automatic cleaning mode, a charging mode, a charging completion mode, a charging stop mode, etc., and controls extension or retraction of each auxiliary cleaning unit 21 or 22 in accordance with the determined operation mode.

The travel controller 242 controls forward movement, backward movement and rotation of the body 10. In more detail, the travel controller 242 controls rotation directions and speed of the drive wheels 41 and 42. When it is sensed that there is an obstacle on the travel path of the body 10, the travel controller 242 also determines whether the body 10 has to turn to the left or to the right or has to move backward.

The charging controller 243 controls the robot cleaner 1 to return to the charger or to the exhaust station when cleaning operation is completed, to cause the robot cleaner 1 to be charged. When charging operation is carried out in a state in which the body 10 docks with the charger, the charging controller 243 determines a charged state of the robot cleaner 1. That is, the charging controller 243 may determine a completely charged state, a power shut-off state of the charger during charging operation, etc.

Hereinafter, methods for controlling extension and retraction of the auxiliary cleaning units of the above-described robot cleaner in accordance with embodiments of the present disclosure will be described.

FIGS. 8A to 8D are views schematically illustrating an operation of the robot cleaner to recognize a charger zone in accordance with an exemplary embodiment of the present disclosure.

Figure 8A:
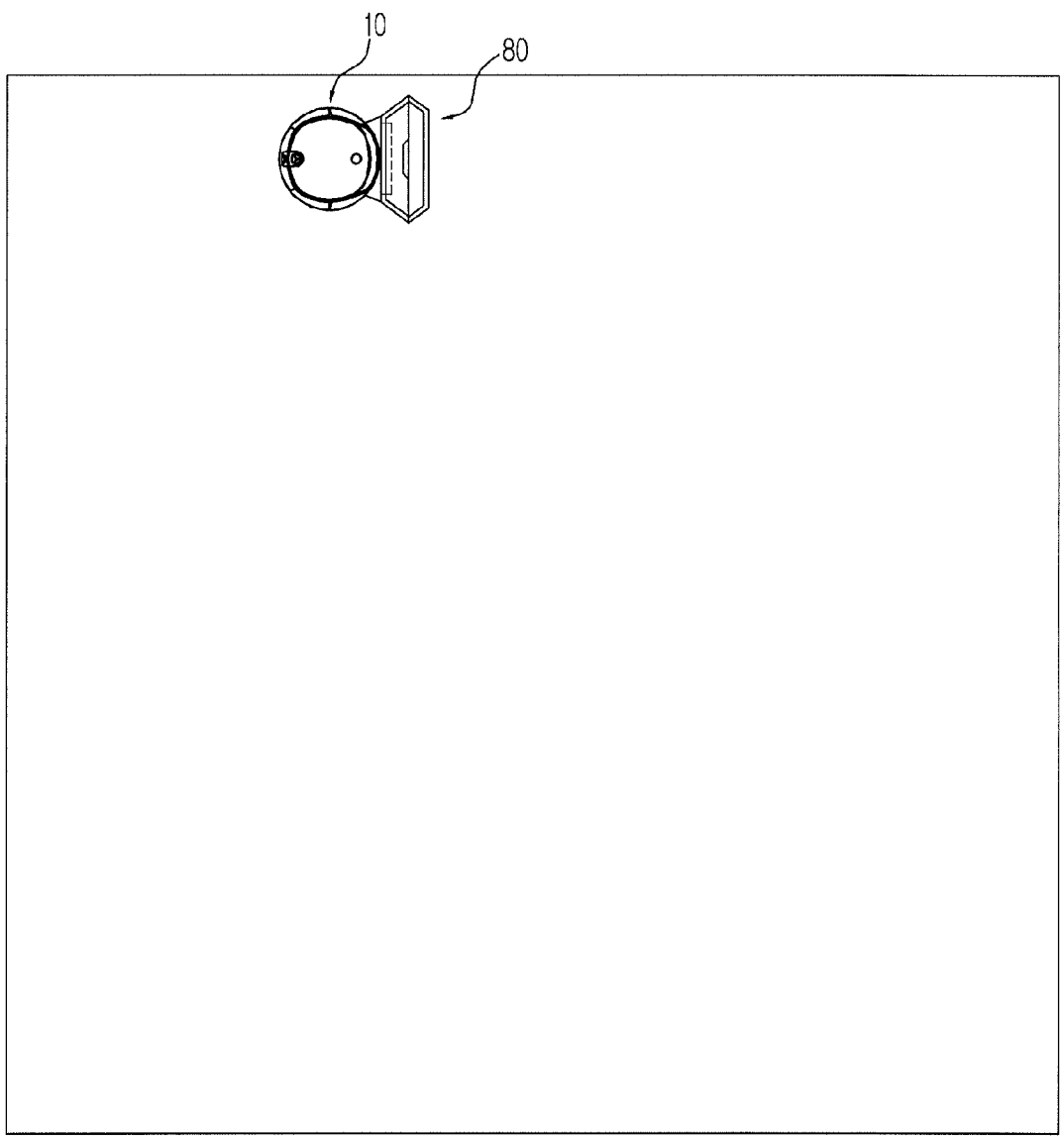
FIGS. 8A to 8D are views schematically illustrating an operation of the robot cleaner to recognize a charger zone in accordance with an exemplary embodiment of the present disclosure.

Referring to FIG. 8A, the body 10 is in contact with the charger 80, for charging. When the body 10 is in contact with the charger 80, the charging controller 241 determines that the body 10 is being charged, namely, in a charging state.

When the body 10 is completely charged or in accordance with an automatic cleaning command from the user, the body 10 is separated from the charger 80 and starts travel about a cleaning region. The body 10 removes dust on the floor while traveling about the cleaning region along a predetermined travel path. To this end, the travel controller 242 creates and stores a cleaning region map including the travel path information of the body 10.

Meanwhile, in this case, the cleaning start position of the body 10 corresponds to the position of the charger 80, unless the user moves the body 10, which is being charged while in contact with the charger 80, from the charger 80 to another position after separating the body 10 from the charger 80.

Figure 8B:
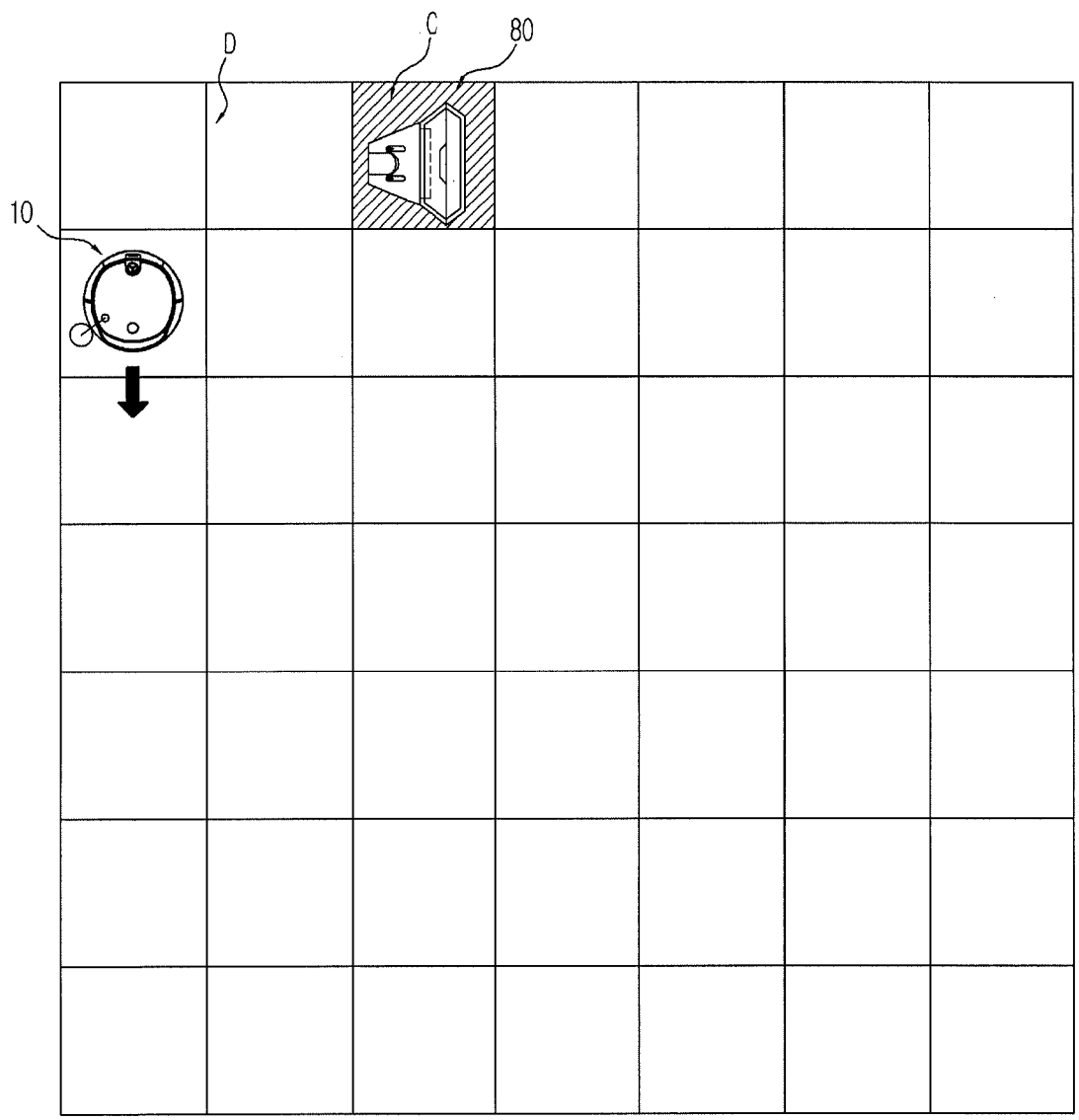

Referring to FIG. 8B, the travel controller 242 creates a cleaning region map, and stores travel regions D corresponding to the travel path of the body 10. The body 10 removes dust from the floor while traveling about the travel regions D along the travel path. The travel controller 242 also stores information about a cleaning completion state of each travel region D. Thus, the body 10 removes dust while sequentially traveling about travel regions D, for which cleaning has not been completed, based on the stored cleaning completion state information from the travel controller 242.

Also, the travel controller 242 may designate the position of the charger 80 to a travel path start position of the body 10. Thus, the travel controller 242 may recognize a charger zone C based on the position of the charger 80 designated in the cleaning region map.

Meanwhile, as shown in FIG. 8B, when the body 10 travels while following a wall, the auxiliary cleaning unit disposed at the side of the wall, for example, the right auxiliary cleaning unit 21, removes dust from an area disposed adjacent to the wall while being in an extended state. Although the right auxiliary cleaning unit 21 is illustrated as traveling while being in an extended state, in FIG. 8B, embodiments of the present disclosure are not limited thereto. For example, when the body 10 travels while following a left wall, the left auxiliary cleaning unit 22 may travel while being in an extended state in the same manner as described above.

Figure 8C:
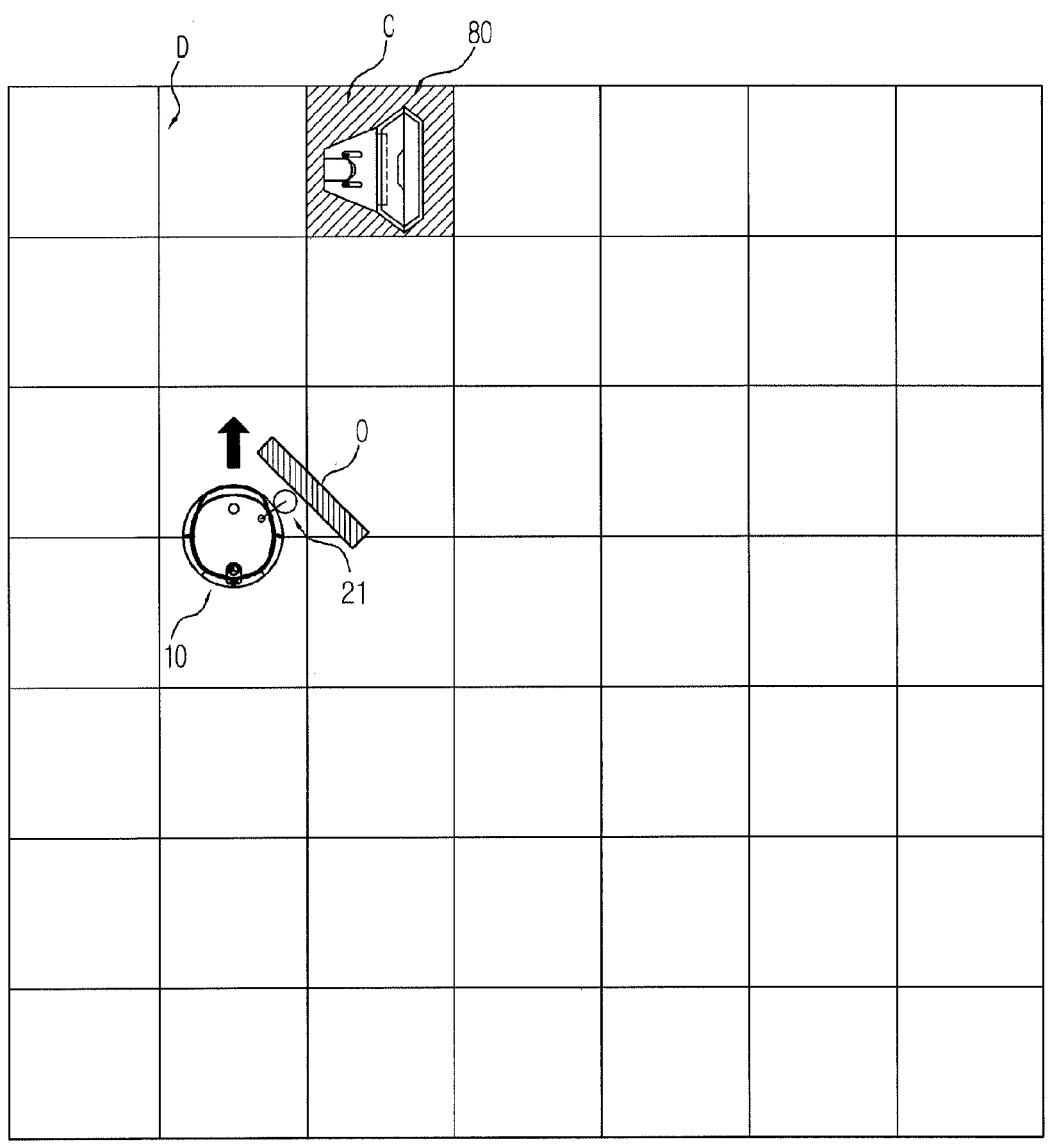

Referring to FIG. 8C, an obstacle 0 may be disposed on the travel path of the body 10. When the obstacle 0 is sensed while the body 10 travels about travel regions D along the travel path, the cleaning controller 241 performs a control operation to extend the auxiliary cleaning unit 21.

In particular, when an obstacle is sensed on the travel path of the body 10 only at one side of the body, the corresponding auxiliary cleaning unit, for example, the auxiliary cleaning unit 21, may be controlled to be retracted into the body 10 after being temporarily outwardly extended from the body 10. Since the control for the auxiliary cleaning unit 21 is carried out in a real time manner, the auxiliary cleaning unit 21 may be continuously driven when the obstacle 0 is continuously sensed, even though the auxiliary cleaning unit 21 has been controlled to be temporarily driven.

Figure 8D:
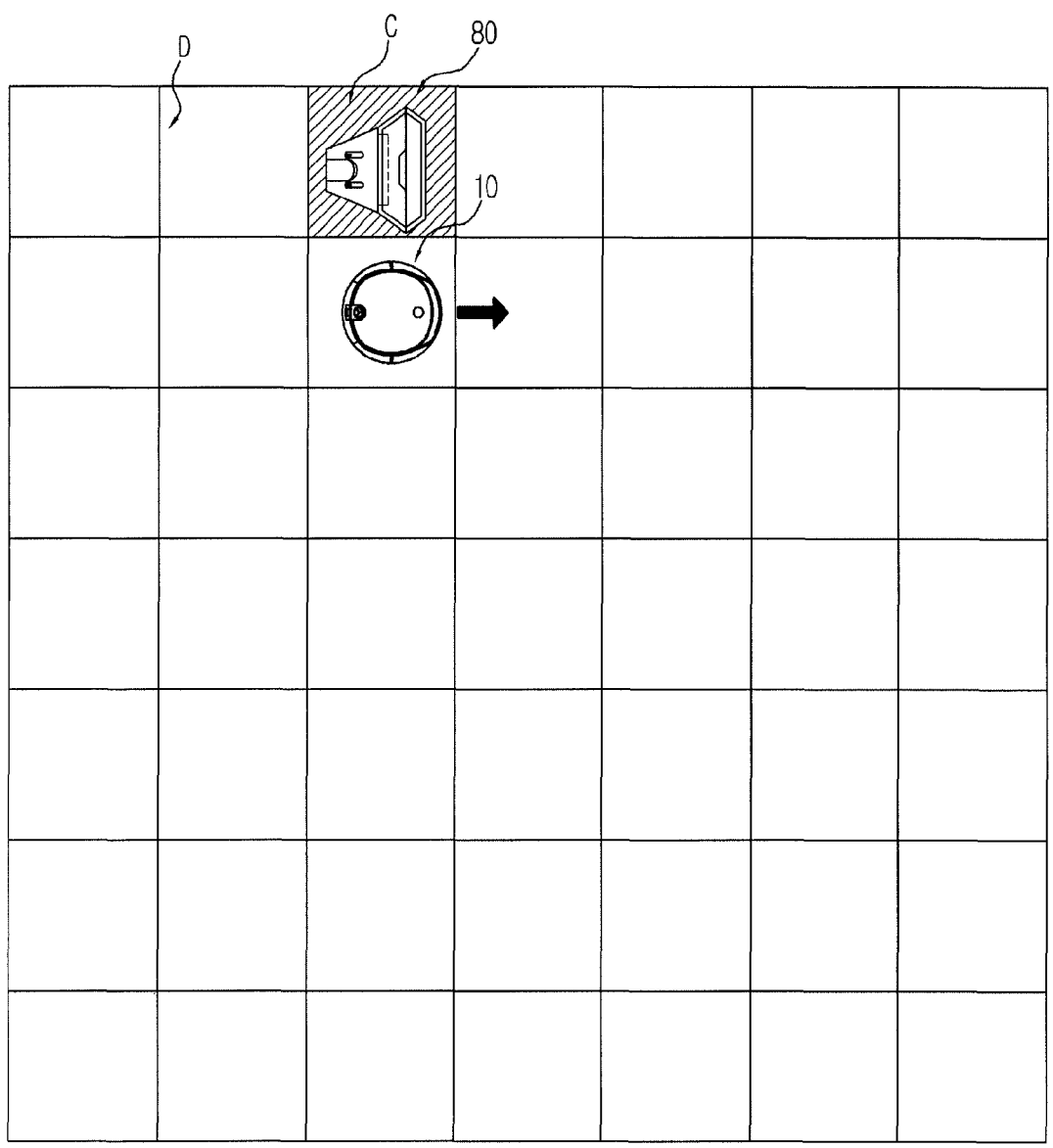

Referring to FIG. 8D, when the body 10 approaches the charger zone C during travel thereof, the obstacle sensing unit 220 may sense, as an obstacle, the charger 80 on the travel path of the body 10. When the cleaning controller 241 determines the charger 80 as an obstacle and, as such, the auxiliary cleaning units 21 and 22 are extended, the possibility that the body 10 strikes the charger 80 may increase. When the position of the charger 80 is shifted due to striking between the body 10 and the charger 80, it may be difficult for the body 10 to return to the charger 80 after completion of cleaning.

To this end, the cleaning controller 241 recognizes the charger zone C, and performs a control operation to prevent the auxiliary cleaning units from extending in the charger zone C. Also, the travel controller 242 performs a control operation to prevent the body 10 from entering the charger zone C and to control the body 10 to travel while bypassing the charger zone C. That is, as shown in FIG. 8D, the body 10 passes a travel region D disposed adjacent to the charger zone C while bypassing the charger zone C.

Figure 9:
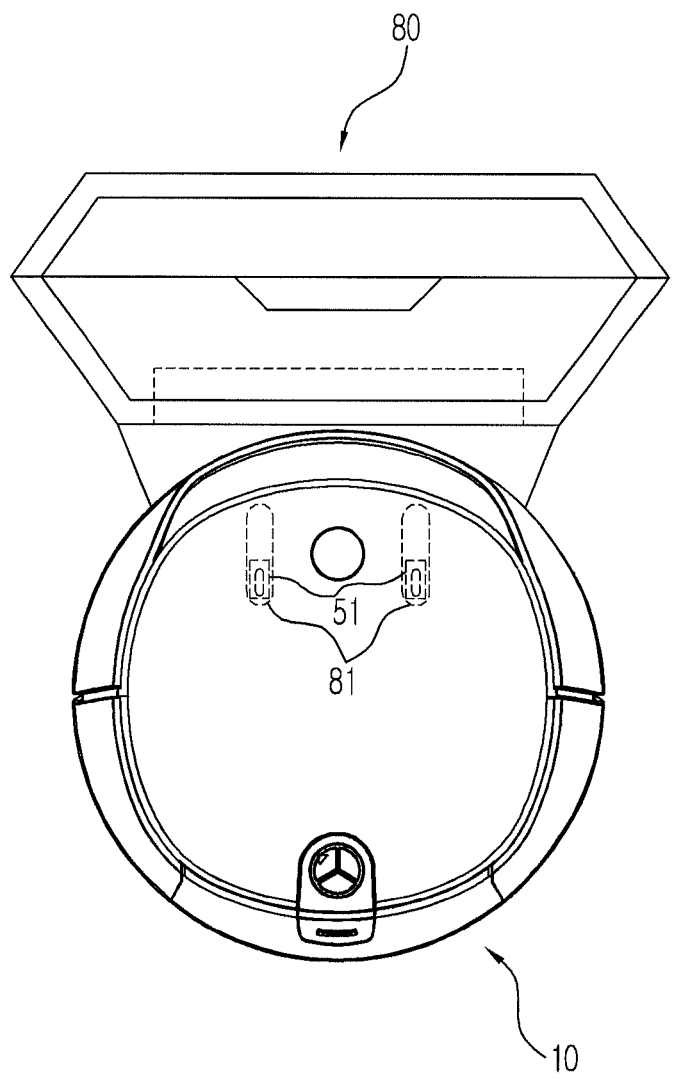
FIG. 9 is a view schematically illustrating an operation of the robot cleaner to recognize a charger zone in accordance with another embodiment of the present disclosure.

FIG. 9 is a view schematically illustrating an operation of the robot cleaner to recognize a charger zone in accordance with another embodiment of the present disclosure.

Referring to FIG. 9, the body 10 is provided with charging terminals 51, to contact the charging terminals 81 of the charger 80. When the charging terminals 51 of the body 10 are in contact with the charging terminals 81 of the charger 80, the charging controller 243 senses that the body 10 is in a charging state. Although FIG. 9 illustrates a charging system using contact between the body 10 and the charger 80, embodiments of the present disclosure are not limited thereto. The body 10 may be charged using an electromagnetic system, even in a state in which the body 10 does not contact the charger 80. Also, the charging controller 243 may be connected to the battery of the body 10, to sense a charging state of the body 10.

The cleaning controller 241 receives information about a charging state of the body 10 from the charging controller 243. When it is determined, based on the received information, that the body 10 is in a charging state, the cleaning controller 241 determines that the body 10 is disposed in the charger zone. When the body 10 is in the charging state, the obstacle sensing unit 220 senses the charger 80 as an obstacle, and then prevents the auxiliary cleaning units 21 and 22 from extending. That is, it may be possible to prevent the body 10 from being separated from the charger 80 due to abnormal extension of the auxiliary cleaning units 21 and 22 or to prevent the charger 80 from being abraded due to striking between the charger 80 and the auxiliary cleaning units 21 and 22.

Figure 10:
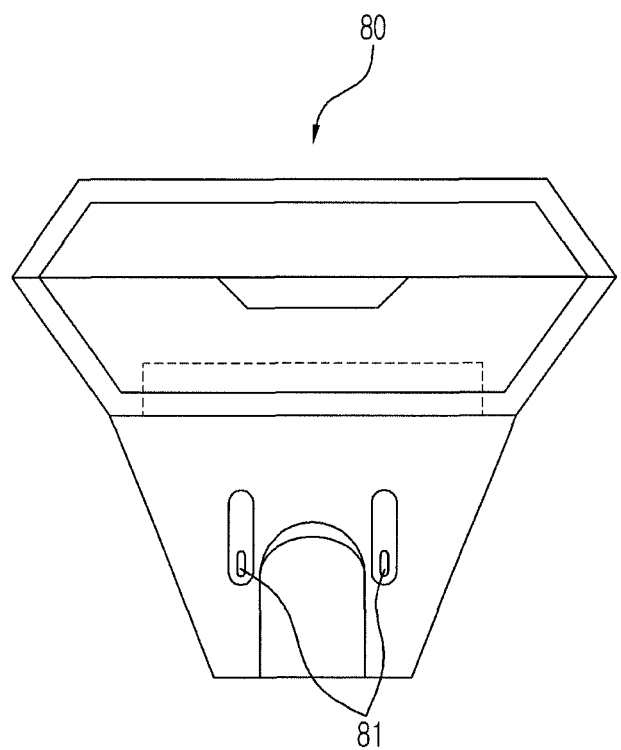
FIG. 10 is a view schematically illustrating an operation of the robot cleaner to recognize a charger zone in accordance with another embodiment of the present disclosure.
Figure 10:
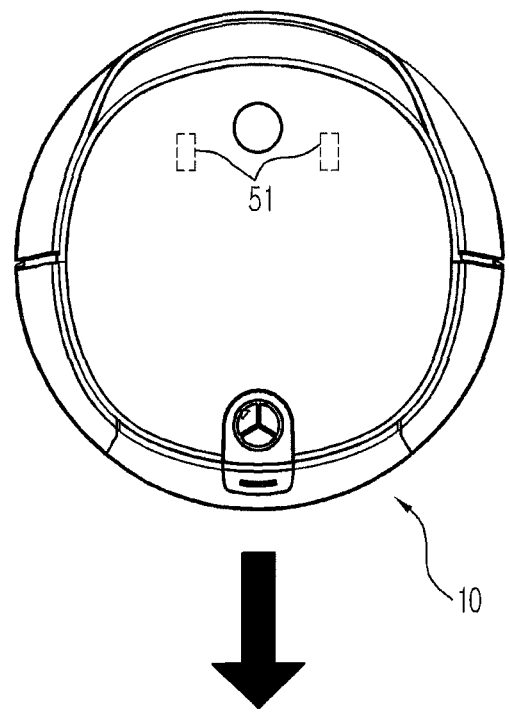

FIG. 10 is a view schematically illustrating an operation of the robot cleaner to recognize a charger zone in accordance with another embodiment of the present disclosure.

FIG. 10 illustrates a state in which the body 10 is separated from the charger 80 in accordance with backward travel thereof carried out after completion of charging. The charging controller 243 checks the residual amount of the battery of the body 10. When the residual amount of the battery reaches a predetermined amount, the charging controller 243 controls travel of the body 10, to return the body 10 to the charger 80, for charging thereof. When the body 10 completes charging, the charging controller 243 performs a control operation such that the body 10 is automatically separated from the charger 80, and then returns to the just previous cleaning area in order to again perform the cleaning operation on the cleaning area. When the body 10 performs backward travel at high speed after completion of charging in the above case, the obstacle sensing unit 220 may sense the charger 80 as an obstacle. In this case, the auxiliary cleaning units 21 and 22 may be extended.

To this end, when the body 10 performs backward travel after completion of charging, the cleaning controller 241 determines that the body 10 is positioned at the charger zone, and then performs a control operation to prevent the auxiliary cleaning units 21 and 22 from extending for a predetermined time. Meanwhile, the charging controller 243 senses a charging completion state of the body 10. When charging is completed, the charging controller 243 transmits information about the charged state of the body 10 to the cleaning controller 241. The cleaning controller 241 prevents the auxiliary cleaning units 21 and 22 from extending for a predetermined time. The predetermined time corresponds to a time taken for the body 10 to be spaced away from the charger 80 by a predetermined distance.

Figure 11:
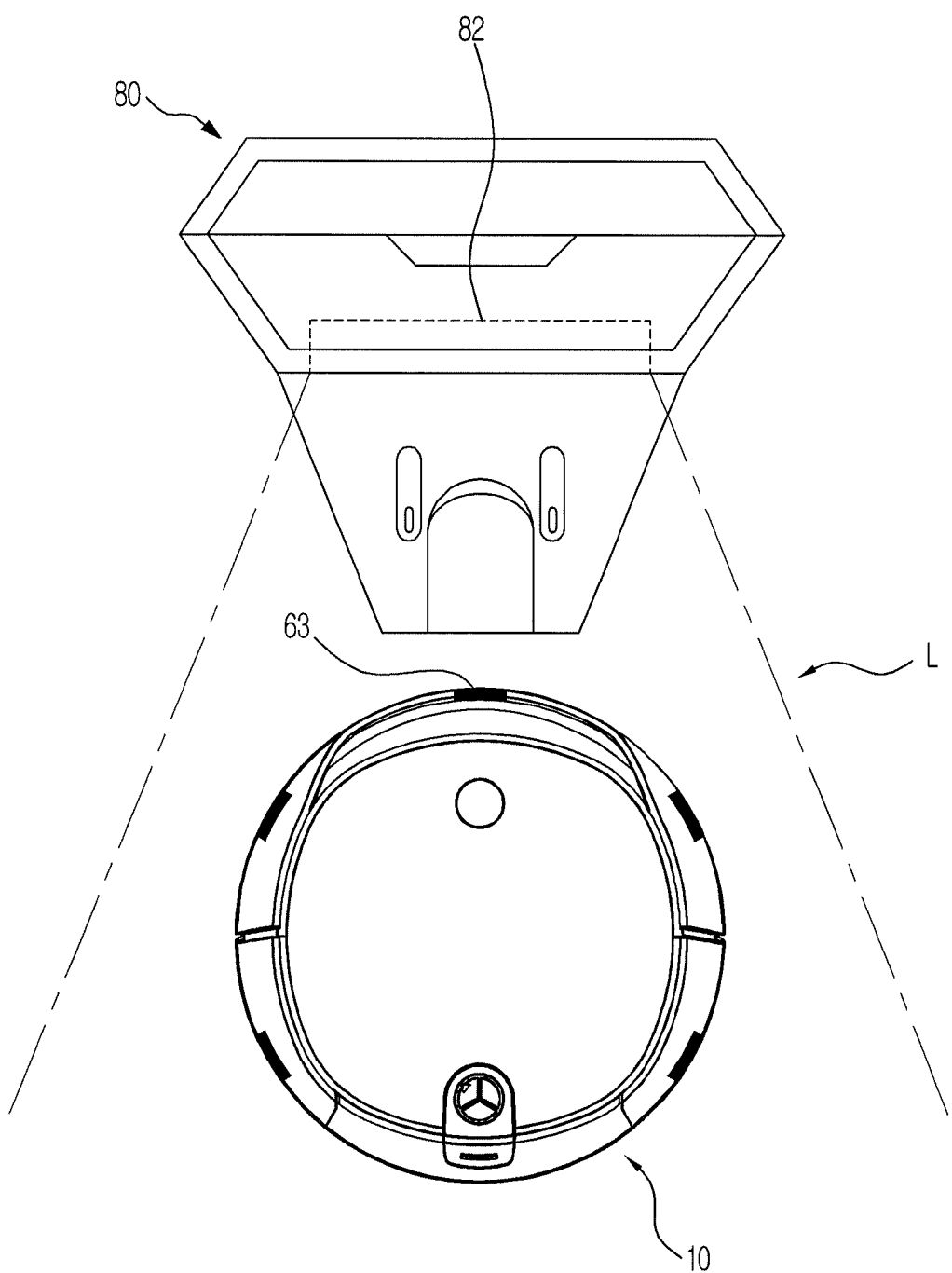
FIGS. 11 and 12 are views schematically illustrating an operation of the robot cleaner to recognize a charger zone in accordance with another embodiment of the present disclosure.
Figure 12:
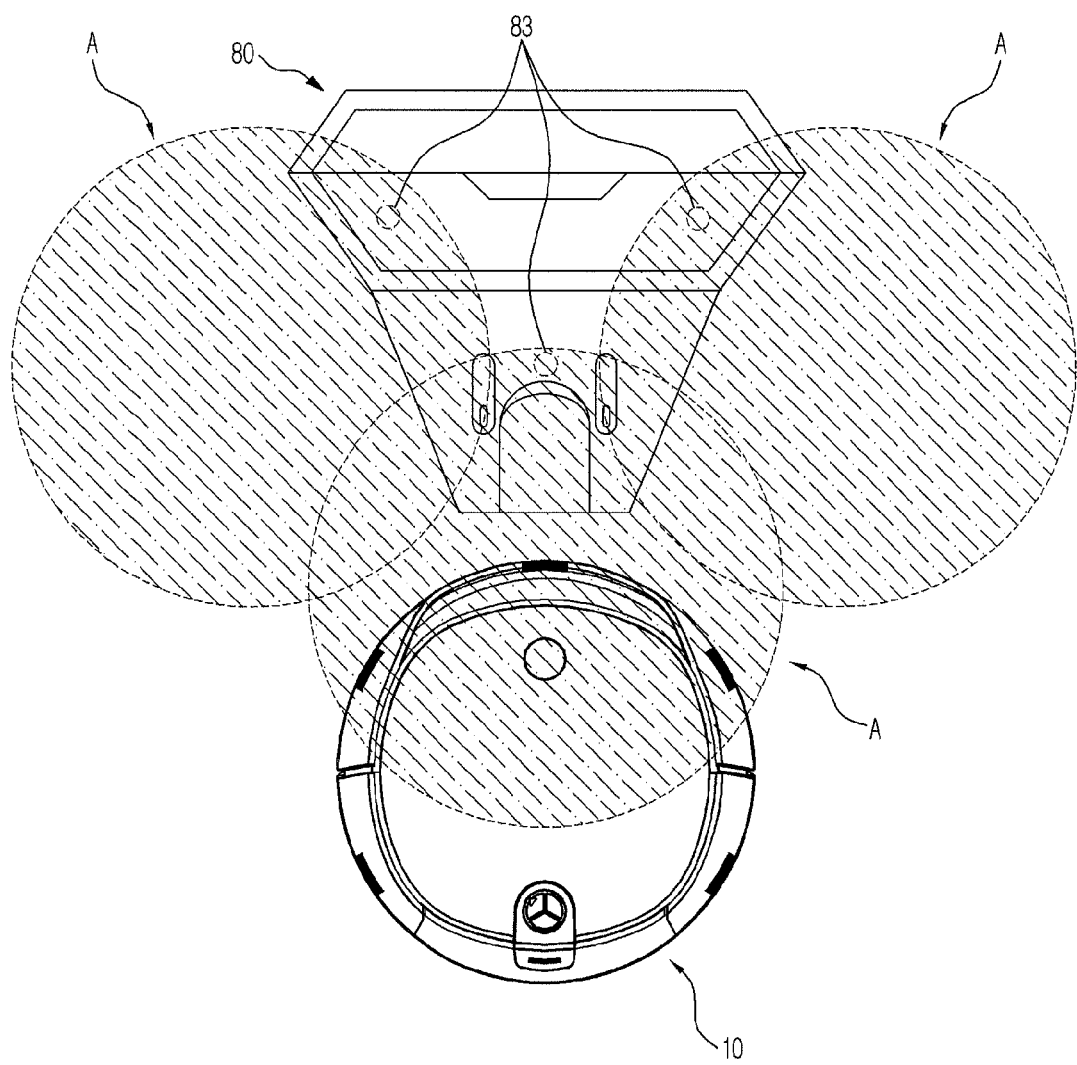

FIGS. 11 and 12 are views schematically illustrating an operation of the robot cleaner to recognize a charger zone in accordance with another embodiment of the present disclosure.

Referring to FIG. 11, the charger 80 transmits an identifying signal in order to enable recognize of the charger 80. The signal sensing unit 230, which is provided at the body 10, senses the identifying signal transmitted from the charger 80. In detail, a plurality of signal sensors 63 is installed at the front surface or lateral surface of the body 10, to receive a signal transmitted from the charger 80. The signal sensing unit 230 senses the identifying signal transmitted from the charger 80, based on signals received by the signal sensors 63.

The identifying signal may be a signal to guide travel of the body 10 toward the charger 80, for docking of the body 10 with the charger 80. That is, when cleaning is completed, the body 10 travels toward the charger 80 in accordance with a travel algorithm for return of the body 10 to the charger 80. In this case, the identifying signal is a signal transmitted from the charger 80 in order to enable tracing of the position of the charger 80, for docking of the body with the charger 80, in detail, contact between the contact terminals of the charger 80 and the contact terminals of the body 10.

For example, a signal transmitting unit 82 to transmit an infrared signal is installed at the charger 80. The signal transmitting unit 82 forms an identifying signal zone L at the front or lateral side of the charger 80. In this case, the signal transmitting unit 82 may transmit infrared signals having different intensities or different ranges. For example, the signal transmitting unit 82 may include a first infrared signal transmitter to transmit a low-power infrared signal, and thus to form a first infrared signal zone, and a second infrared signal transmitter to transmit a high-power infrared signal, and thus to form a second infrared signal zone smaller than the first infrared signal zone. Although the first and second infrared signals overlap each other, they may be distinguished from each other in accordance with the ranges or intensities thereof.

That is, the signal transmitting unit 82 installed at the charger 80 forwardly or laterally transmits an infrared signal within a predetermined angular range, to form an identifying signal zone. Of course, the identifying signal is not limited to the infrared signal. An ultrasonic wave signal or a laser signal may be used in the same manner as in the infrared signal.

The signal sensors 63, which are installed at the body 10, receive the infrared signal or the like. When the signal sensing unit 230 senses an identifying signal, based on the signal received by the signal sensors 63, the cleaning controller 241 determines that the body 10 is positioned at the charger zone, and then performs a control operation to prevent the auxiliary cleaning units 21 and 22 from extending. That is, the cleaning controller 241 recognizes the charger zone based on the identifying signal, and then controls the body 10 to travel while bypassing the charger zone, and prevents the auxiliary cleaning units 21 and 22 from extending. Upon sensing a signal to guide travel of the body 10 while the body 10 travels along a travel path for cleaning, under the condition in which it is unnecessary to charge the body 10 or cleaning has not been completed, the travel controller 242 does not control travel of the body for docking of the body 10 with the charger 80. This is because it is unnecessary to dock the body 10 with the charger 80 in the above case.

Referring to FIG. 12, the identifying signal may be a signal, which forms a zone of the charger 80. That is, the identifying signal forms a charger zone having a certain curved surface at the front or lateral side of the charger 80, to prevent the body 10 from entering the charger 80. The identifying signal causes the cleaning controller 241 to sense the charger 80 as an obstacle, thereby causing the body 10 to travel while bypassing the charger 80, differently than the signal to dock the body 10 with the charger 80.

As described above, signal transmitters 83 to transmit identifying signals are installed at the charger 80. By the signal transmitters 83, identifying signal zones A are formed at the front and lateral sides of the charger 80. In this case, the identifying signals are divided into a first identifying signal and a second identifying signal in accordance with ranges and intensities thereof, even though they overlap with one another. For example, when the second signal zone is sensed, the travel controller 242 determines that the charger 80 is positioned on the travel path of the body 10. In this case, the travel controller 242 may more minutely control travel of the body 10. For example, the sensitivity of the obstacle sensing unit 220 is increased, to prevent the body 10 from striking the charger 80. When the first and second signals are simultaneously sensed, the travel controller 242 determines that there is a possibility that the body 10 strikes the charger 80. In this case, the travel controller 242 controls the body 10 to rotate and then to travel while bypassing the charger 80.

The identifying signal zone A formed by the identifying signal transmitted from the charger 80 may be formed by at least one of an infrared signal, an ultrasonic wave signal and a laser signal.

The signal sensors 63, which are installed at the body 10, receive the infrared signal or the like. The cleaning controller 241 senses the identifying signal, through the signal sensing unit 230. When the identifying signal is sensed, the cleaning controller 241 determines the charger 80 as an obstacle, and then performs a control operation to prevent the auxiliary cleaning units 21 and 22 from extending. For a general obstacle, the cleaning controller 241 performs a control operation to extend the auxiliary cleaning units 21 and 22 and thus to remove dust from an area disposed adjacent to the obstacle by the auxiliary cleaning units 21 and 22. For the charger 80, however, the cleaning controller 241 performs a control operation to prevent the auxiliary cleaning units 21 and 22 from extending and thus to prevent the body 10 from striking the charger 80 and to prevent the position of the charger 80 from being shifted.

Figure 13:
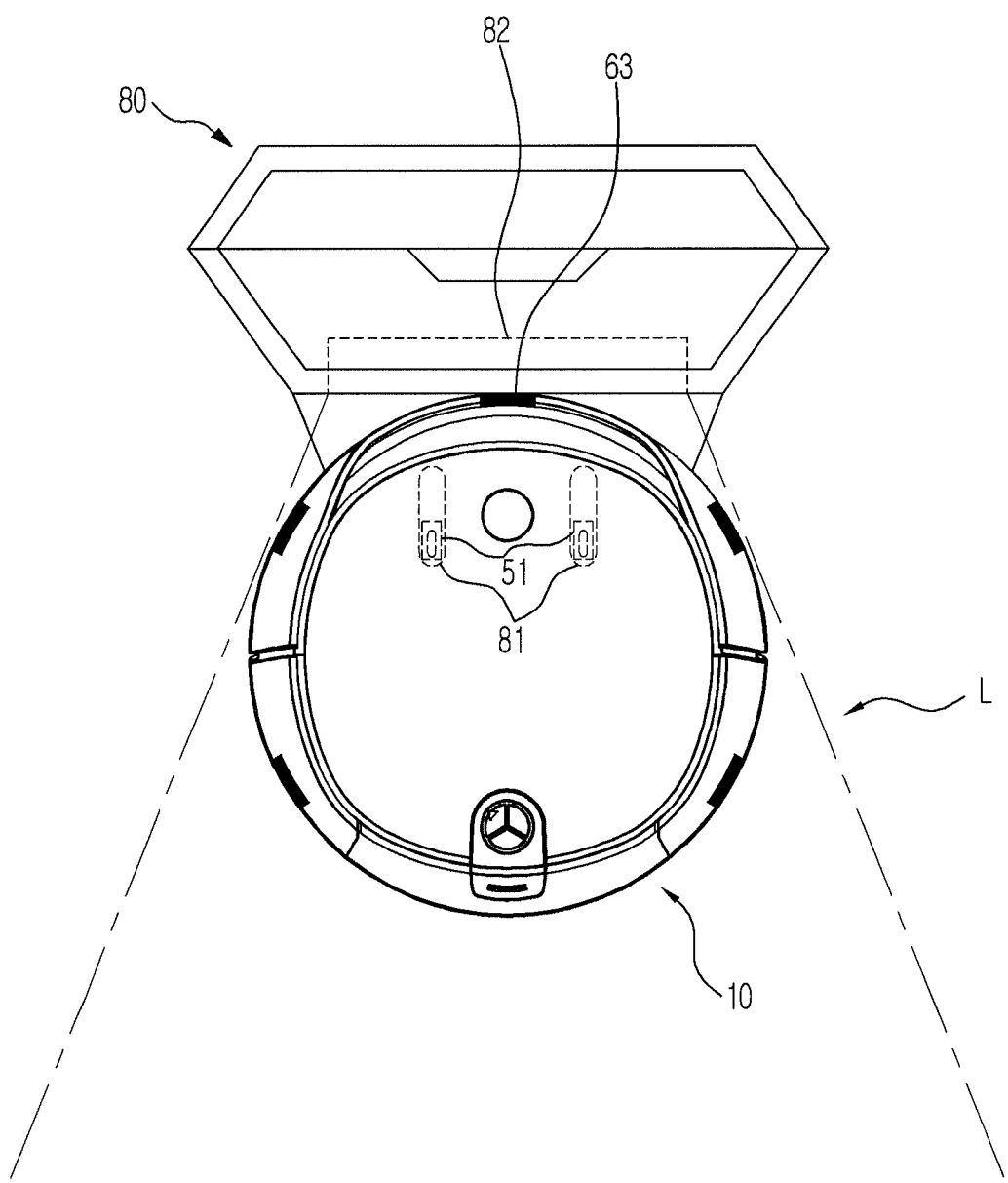
FIG. 13 is a view schematically illustrating an operation of the robot cleaner to recognize a charger zone in accordance with another embodiment of the present disclosure.

FIG. 13 is a view schematically illustrating an operation of the robot cleaner to recognize a charger zone in accordance with another embodiment of the present disclosure.

Referring to FIG. 13, the body 10 may dock with the charger 80, for charging thereof. When the body 10 docks with the charger 80, the charging terminals 51 of the body 10 contact the charging terminals 81 of the charger 80. In this state, the signal sensors 63 receive a signal L transmitted from the signal transmitting unit 82 of the charger 80. Accordingly, the signal sensing unit 230 senses an identifying signal indicating the charger zone. Meanwhile, the charging controller 243 senses contact between the charging terminals 51 of the body 10 and the charging terminals 81 of the charger 80. Although the charging controller 243 may not sense the charging state of the body 10, the cleaning controller 241 may determine that the body 10 is positioned at the charger zone, when the identifying signal from the charger 80 is sensed in a stopped state of the body 10. That is, the cleaning controller 241 may perform a control operation to prevent the auxiliary cleaning units 21 and 22 from extending when the body 10 is positioned at the charger zone, for charging thereof.

Meanwhile, FIG. 13 illustrates, as an example of the identifying signal, a signal to guide the body 10 toward the charger 80, for docking of the body 10 with the charger 80. Of course, the identifying signal is not limited to the illustrated signal. The identifying signal may also be applied, in the same manner as described above, to a signal causing the charger 80 to be sensed as an obstacle, thereby causing the body 10 to travel while bypassing the charger 80. For example, even when a signal to prevent the body 10 from entering the charger 80 is used, the body 10 may enter the charger 80. That is, when the body 10 approaches the charger 80 in a return mode, for charging thereof, it may contact the charger 80 even if the identifying signal from the charger 80 is sensed. Even when the return mode for charging of the body 10 is completed in accordance with contact between the body 10 and the charger 80, and the charging mode starts, the charger 80 may continuously transmit the identifying signal. Although the cleaning charger 241 may sense the charger 80 as an obstacle in accordance with sensing of the identifying signal from the charger 80, it may determine, based on the stopped state of the body 10, that the body 10 is positioned at the charger zone, and may then perform a control operation to prevent the auxiliary cleaning units 21 and 22 from extending. Thus, it may be possible to prevent the auxiliary cleaning units 21 and 22 from extending during charging of the body 10 due to sensing of the charger 80 as an obstacle.

Figure 14:
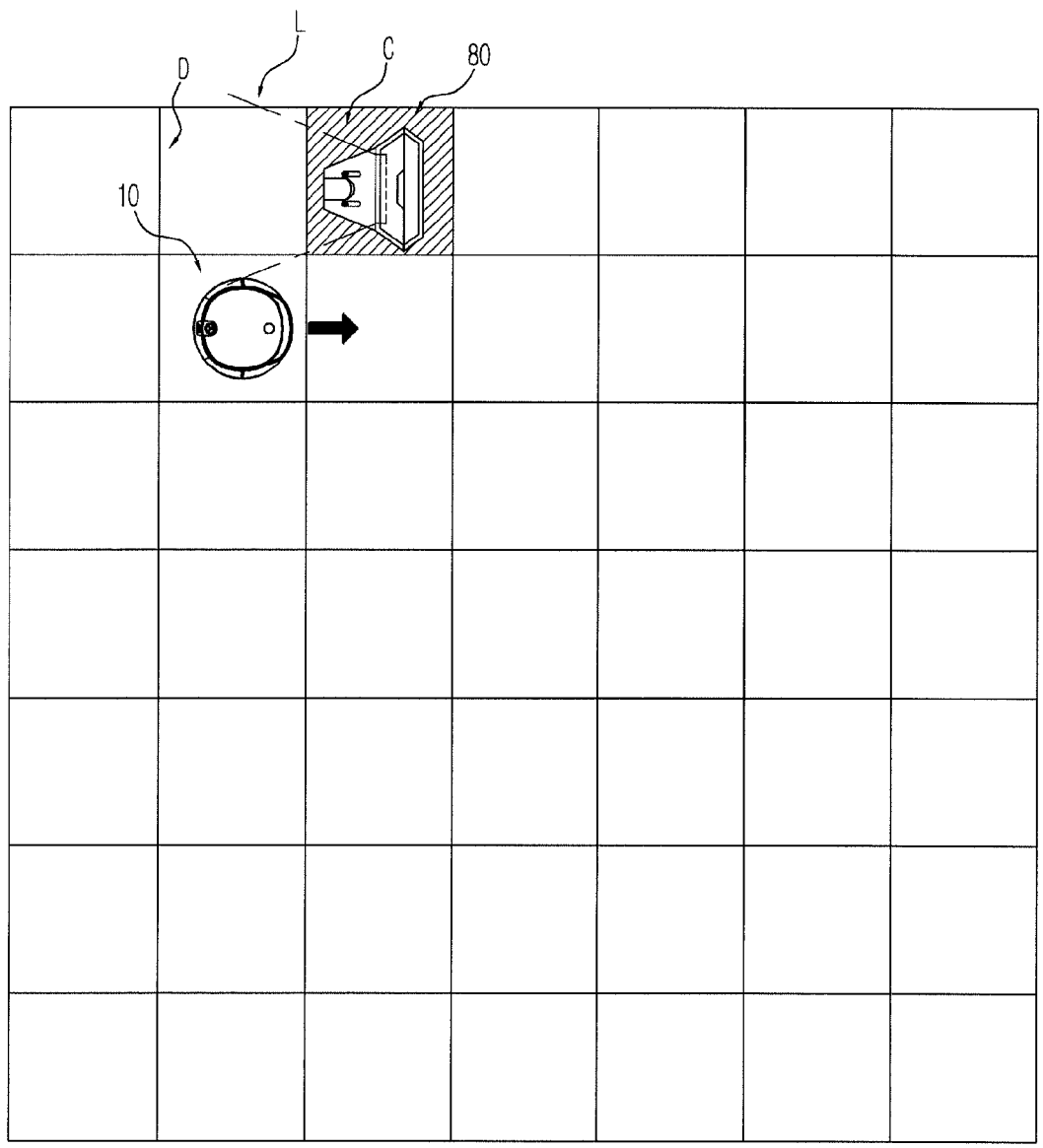
FIG. 14 is a view schematically illustrating an operation of the robot cleaner to recognize a charger zone in accordance with another embodiment of the present disclosure.

FIG. 14 is a view schematically illustrating an operation of the robot cleaner to recognize a charger zone in accordance with another embodiment of the present disclosure.

Referring to FIG. 14, the body 10 removes dust from the floor while traveling on a cleaning region along a predetermined travel path. To this end, the travel controller 242 creates a cleaning region map including information about the travel path of the body 10, and stores travel regions D corresponding to the travel path of the body 10. The body 10 removes dust from the floor while traveling on the travel regions D along the travel path.

When a identifying signal L from the charger 80 is sensed on the travel path of the body 10, the travel controller 242 may designate the position, from which the identifying signal L is transmitted, to the position of the charger 80. The travel controller 242 identifies the charger zone C, based on the position of the charger 80 designated in the cleaning region map, and does not sense the charger zone C as an obstacle. That is, the travel controller 242 performs a control operation not only to cause the body 10 to travel while bypassing the charger zone C, but also to prevent the auxiliary cleaning units 21 and 22 from extending. When the auxiliary cleaning units 21 and 22 are in an extended state in the above case, the possibility that the body 10 strikes the charger 80 may increase. Also, the position of the charger 80 may be shifted due to the striking. To this end, the cleaning controller 241 recognizes the charger zone C, and performs a control operation to prevent the auxiliary cleaning units 21 and 22 from extending in the charger zone C.

FIG. 14 illustrates, as an example of the identifying signal, a signal to guide the body 10 toward the charger 80, for docking of the body 10 with the charger 80. Of course, the identifying signal is not limited to the illustrated signal. The identifying signal may also be applied, in the same manner as described above, to a signal causing the charger 80 to be sensed as an obstacle, thereby causing the body 10 to travel while bypassing the charger 80.

Figure 15:
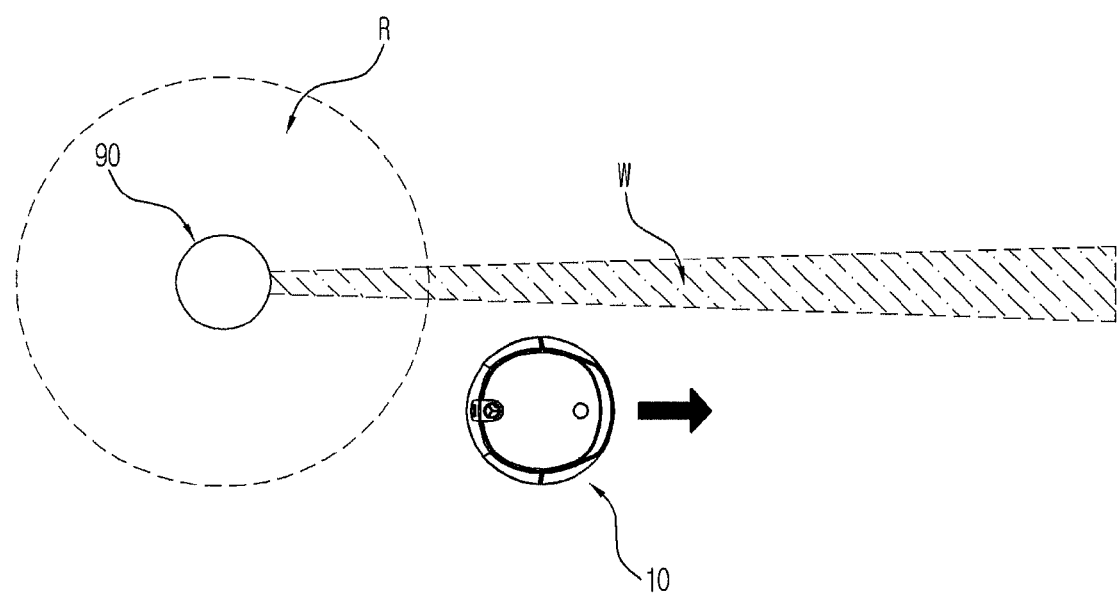
FIG. 15 is a view schematically illustrating an operation of the robot cleaner to recognize a virtual obstacle zone in accordance with an exemplary embodiment of the present disclosure.

FIG. 15 is a view schematically illustrating an operation of the robot cleaner to recognize a virtual obstacle zone in accordance with an exemplary embodiment of the present disclosure.

Referring to FIG. 15, an extension prevention signal generating unit 90 forms an extension prevention zone by transmitting an identifying signal. The extension prevention zone is a virtual obstacle zone formed by the identifying signal transmitted from the extension prevention signal generating unit 90. The body 10 is controlled to travel while bypassing the virtual obstacle zone.

The signal sensing unit 230 provided at the body 10 senses the identifying signal transmitted from the extension prevention signal generating unit 90. Based on the sensed identifying signal, the cleaning controller 241 recognizes the extension prevention zone. The signal sensors 63, which are installed at the front and lateral surfaces of the body 10, as described above, receive the signal transmitted from the extension prevention signal generating unit 90. Based on the signal received by the signal sensors 63, the signal sensing unit 230 senses the identifying signal.

The identifying signal may form a virtual obstacle zone extending in one direction from the extension prevention signal generating unit 90 while having a predetermined size. For example, the identifying signal may form a rectilinear virtual wall zone W having a predetermined thickness and a predetermined length. When the virtual wall zone W is sensed, the travel controller 242 performs a control operation to cause the body 10 to travel after turning without entering the virtual wall zone W. Since the virtual wall zone W is not a floor area, which is disposed adjacent to a wall and at which the auxiliary cleaning units 21 and 22 extend to remove dust, the cleaning controller 241 performs a control operation to prevent the auxiliary cleaning units 21 and 22 from extending when the virtual wall zone W is sensed. The identifying signal, which forms the virtual wall zone W, as described above, may include at least one of an infrared signal, an ultrasonic wave signal and a laser signal, which may be transmitted from the extension prevention signal generating unit 90 in one direction within a certain angular range.

Meanwhile, the identifying signal may form a virtual obstacle zone R having a predetermined curved surface around the extension prevention signal generating unit 90. In this case, the extension prevention signal generating unit 90 prevents access of the body 10 to the virtual obstacle zone R. That is, the identifying signal causes the virtual obstacle zone R around the extension prevention signal generating unit 90 to be sensed as an obstacle, thereby causing the body 10 to travel while bypassing the extension prevention signal generating unit 90. In this case, the cleaning controller 241 performs a control operation to prevent the auxiliary cleaning units 21 and 22 from extending, even though it senses the virtual obstacle zone R as an obstacle. This is because, when the auxiliary cleaning unit 21 or 22 strikes the extension prevention signal generating unit 90, the position of the extension prevention signal generating unit 90 may be shifted, thereby causing the virtual wall zone W to be varied. Generally, there may be, beyond the virtual wall zone W, an article, etc., which have a possibility of being damaged due to impact. In order to prevent access of the body 10 to such an article, the user forms the virtual wall zone W, using the extension prevention signal generating unit 90.

Infrared signals may be used as the identifying signal, which forms the virtual obstacle zone R having a predetermined curved surface around the extension prevention signal generating unit 90. That is, when a plurality of signal transmitters is installed at a lateral surface of the extension prevention signal generating unit 90, to transmit infrared signals toward the floor at a predetermined angle, a signal zone having a predetermined curved shape is formed around the extension prevention signal generating unit 90. Of course, the identifying signal is not limited to the infrared signal. An ultrasonic wave signal or a laser signal may be used in the same manner as in the infrared signal.

Figure 16:
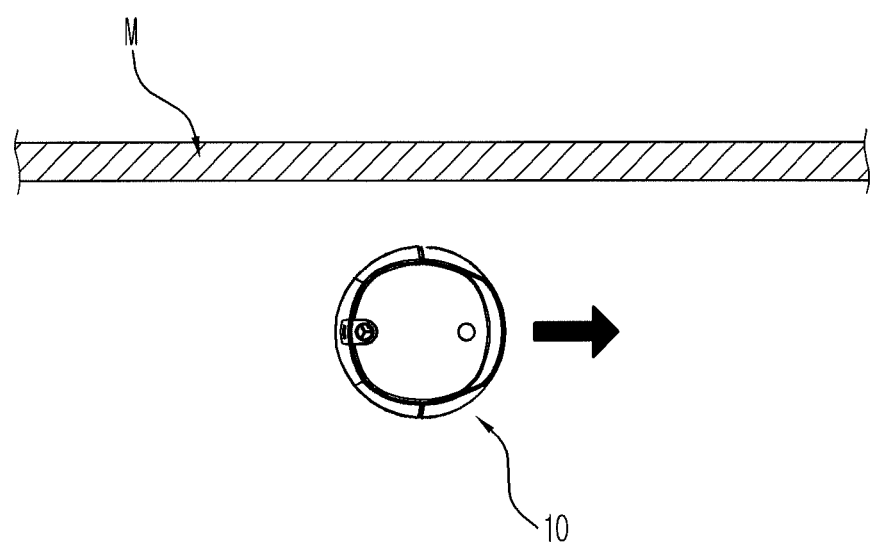
FIG. 16 is a view schematically illustrating an operation of the robot cleaner to recognize a virtual obstacle zone in accordance with another embodiment of the present disclosure.

FIG. 16 is a view schematically illustrating an operation of the robot cleaner to recognize a virtual obstacle zone in accordance with another embodiment of the present disclosure.

Referring to FIG. 16, the signal sensing unit 230 may sense a magnetic field signal, in addition to an infrared signal, an ultrasonic wave signal, or a laser signal. The cleaning controller 241 recognizes an extension prevention zone, based on the sensed magnetic field signal, and then performs a control operation to prevent the auxiliary cleaning units 21 and 22 from extending.

Meanwhile, the extension prevention zone may be formed by an extension prevention signal generating unit, which generates a magnetic field. For example, as shown in FIG. 16, the extension prevention zone may be a magnetic field zone formed by a magnetic belt M installed on the floor. When the magnetic belt M is disposed on the travel path of the body 10, the travel controller 242 senses the magnetic belt M as an obstacle, and then performs a control operation to cause the body 10 to travel while bypassing the magnetic belt M. Also, the cleaning controller 241 determines the magnetic field zone as the extension prevention zone, and then performs a control operation to prevent the auxiliary cleaning units 21 and 22 from extending. The magnetic belt M is an example of a configuration to form a magnetic field zone and, as such, embodiments of the present disclosure are not limited thereto. Any device or article, which forms a magnetic field, may form the extension prevention zone in the same manner as described above.

Figure 17:
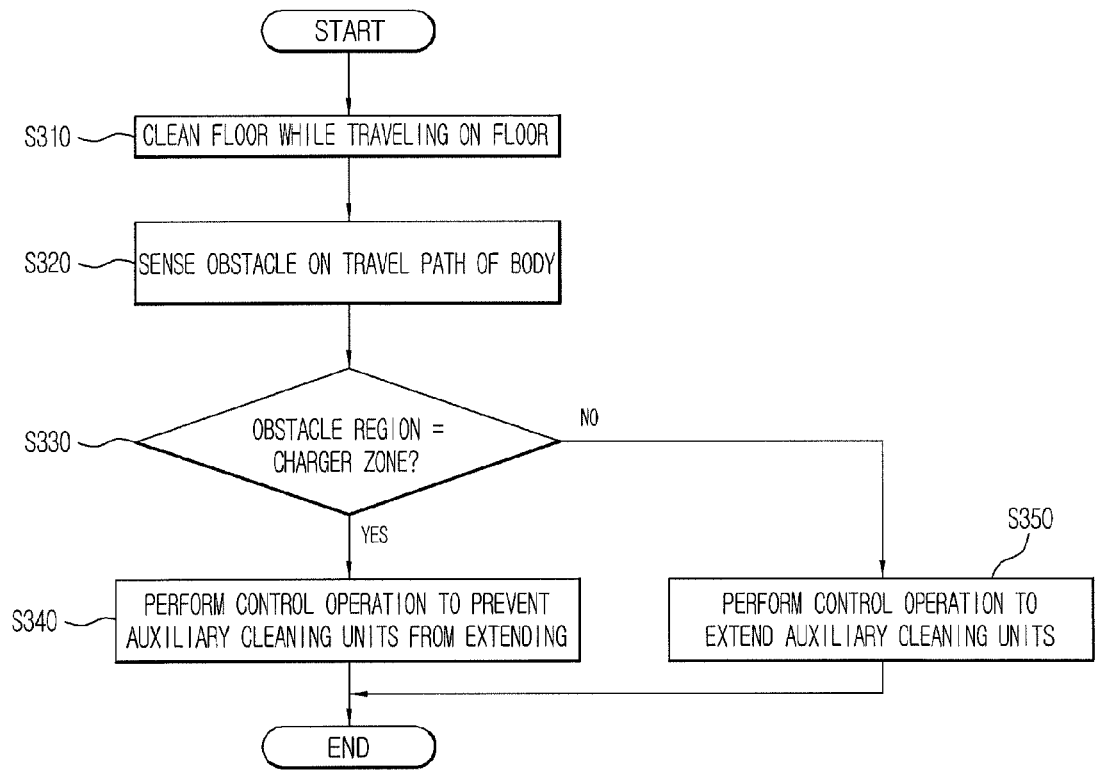
FIG. 17 is a flowchart schematically illustrating a method for controlling the robot cleaner in accordance with an exemplary embodiment of the present disclosure.

FIG. 17 is a flowchart schematically illustrating a method for controlling the robot cleaner in accordance with an exemplary embodiment of the present disclosure.

Referring to FIG. 17, first, the body 10 performs cleaning by sweeping dust on the floor by the main brush while traveling on the floor in accordance with a travel algorithm (S310). Simultaneously, sensing of an obstacle on a travel path of the body 10 is carried out through the obstacle sensing unit 220, which is provided at the body 10, to transmit/receive an infrared signal or an ultrasonic wave signal (S320).

When an obstacle is sensed, it is determined whether the region of the sensed obstacle is a charger zone (S330). Recognition of the charger zone may be achieved in various manners. The robot cleaner 1 may travel about a cleaning region and determine whether cleaning of the cleaning region is completed, in accordance with a cleaning region map including information about the travel path of the body 10. In this case, recognition of the charger zone may be achieved by designating the start position of the travel path of the body 10 to the position of the charger 80. That is, the position of the charger 80 designated in the cleaning region map may be recognized as the charger zone.

Also, recognition of the charger zone may be achieved using a method of sensing a charging state of the body 10. That is, when the body 10 is being charged, it may be determined that the body 10 is positioned at the charger zone. In a similar method, recognition of the charger zone may be achieved through sensing of the charging completion state of the body 10. That is, when the body 10 travels backward after completing charging, it may be determined that the body 10 is positioned at the charger zone for a predetermined time. After completion of charging, the body 10 returns to a position, at which cleaning was completed for charging, through backward travel. In this case, it is determined that the body 10 is positioned at the charger zone for a predetermined time, in order to prevent the auxiliary cleaning units 21 and 22 from extending during backward travel of the body 10. Accordingly, it may be possible to prevent the body from striking the charger 80 during charging of the body 10 or after completion of charging.

Recognition of the charger zone may also be achieved using a method in which an identifying signal is transmitted from the charger 80, and the transmitted signal is then sensed. That is, recognition of the charger zone may be achieved by the signal sensing unit 230, which is provided at the body 10, to sense a identifying signal. In this case, the identifying signal may be a signal to guide travel of the body 10, for docking of the body 10 with the charger 80, or a signal to form a charger zone having a predetermined curved surface at the front or lateral side of the charger 80. When an identifying signal is sensed, the obstacle region sensed based on the sensed identifying signal may be recognized as the charger zone. Meanwhile, when the body 10 contacts the charger 80, for charging thereof, it is in a stopped state. In this state, an identifying signal may be sensed. That is, when an identifying signal is sensed in a stopped state of the body 10, it may be determined that the body 10 is positioned at the charger zone. Also, the position, from which an identifying signal is transmitted, may be designated to the position of the charger 80, using the cleaning region map, as described above.

When the sensed obstacle region is the charger zone, a control operation is carried out to prevent the auxiliary cleaning units 21 and 22 from extending (S340). Accordingly, it may be possible to prevent the auxiliary cleaning units 21 and 22 from striking the charger 80 due to extension thereof. Also, the body 10 is controlled to travel while bypassing the charger 80. Accordingly, it may be possible to prevent the body 10 from striking the charger 80.

When the sensed obstacle region is not the charger zone, a control operation is carried out to extend the auxiliary cleaning units 21 and 22, and thus to cause the auxiliary cleaning units 21 and 22 to remove dust accumulated on an area disposed adjacent to the sensed obstacle (S350).

Figure 18:
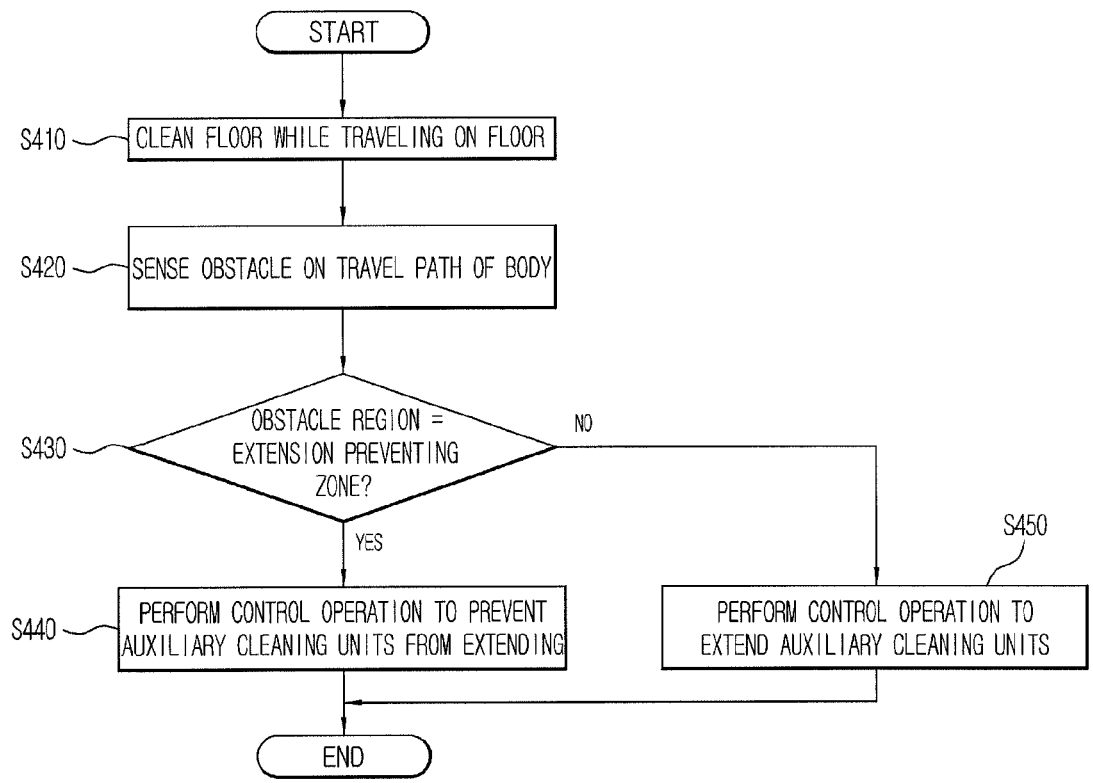
FIG. 18 is a flowchart schematically illustrating a method for controlling the robot cleaner in accordance with another embodiment of the present disclosure.

FIG. 18 is a flowchart schematically illustrating a method for controlling the robot cleaner in accordance with another embodiment of the present disclosure.

Referring to FIG. 18, first, the body 10 performs cleaning by sweeping dust on the floor by the main brush while traveling on the floor in accordance with a travel algorithm (S410). Simultaneously, sensing of an obstacle on a travel path of the body 10 is carried out (S420).

When an obstacle is sensed, it is determined whether the region of the sensed obstacle is an extension prevention zone (S430). Recognition of the charger zone may be achieved, using an identifying signal transmitted from the extension prevention signal generating unit 90. To this end, the signal sensing unit 230, which senses the identifying signal, may be provided at the body 10.

The extension prevention zone may be formed in various manners. For example, a virtual obstacle zone extending from the extension prevention signal generating unit 90 in one direction while having a predetermined size may be formed. Alternatively, a virtual obstacle zone having a predetermined curved surface around the extension prevention signal generating unit 90 may be formed. Although there is no actual obstacle in the virtual obstacle zone, the virtual obstacle zone is sensed as if there is an obstacle in the virtual obstacle zone, so as to control the body 10 to travel while bypassing the virtual obstacle zone. The virtual obstacle zone is different from obstacle regions in that the auxiliary cleaning units 21 and 22 are prevented from extending in the virtual obstacle zone, as will be described later. As described above, the identifying signal may include an infrared signal, an ultrasonic wave signal, or a laser signal.

Meanwhile, the extension prevention zone may be formed in the form of a magnetic field zone. For example, a device or an article, which generates a magnetic field, such as a magnetic belt, may be installed on the floor. In this case, it may be possible to discriminate the extension prevention zone from obstacle regions through sensing of a magnetic field signal. When a magnetic field zone is sensed, based on the sensed magnetic field signal, the body 10 is controlled to travel while bypassing the magnetic field zone. In this case, the auxiliary cleaning units 21 and 22 may also be controlled to be prevented from extending. When magnetic sensors are used as the signal sensors provided at the body 10, it may be possible to sense the magnetic field generated by the magnetic belt or the like.

Formation of the extension prevention zone is not limited to the above described methods. The extension prevention zone may have the form of an access preventing line, to prevent access of the body 10 thereto. The robot cleaner 1 may sense the access preventing line, through sensing of an electromagnetic signal or an optical signal, or vision-based recognition.

When the sensed obstacle region is the extension prevention zone, a control operation is carried out to prevent the auxiliary cleaning units 21 and 22 from extending (S440). On the other hand, when the sensed obstacle region is not the extension prevention zone, a control operation is carried out to extend the auxiliary cleaning units 21 and 22, and thus to cause the auxiliary cleaning units 21 and 22 to remove dust accumulated on an area disposed adjacent to the sensed obstacle (S450).

The above-described operations of the robot cleaner 1 may be applied to the exhaust station to exhaust dust collected in the robot cleaner 1 in the same manner as applied to the charger 80.

Meanwhile, although the auxiliary cleaning units 21 and 22 of the robot cleaner 1 have been described as being coupled to left and light sides of the body 10 in the above-described embodiments of the present disclosure, there is no limitation as to the number of auxiliary cleaning units and the installation positions of auxiliary cleaning units.

As apparent from the above description, in accordance with one aspect of the present disclosure, it may be possible to recognize the charger zone or extension prevention zone, and thus to prevent the auxiliary cleaning units from extending. Accordingly, it may be possible to prevent the auxiliary cleaning tool of each auxiliary cleaning unit from striking an additional device. Since the body travels while bypassing the additional device without striking the additional device, it may be possible to prevent the position of the additional device from being shifted and to prevent the additional device from being damaged. Since the position of the additional device, for example, the charger is not shifted, the body of the robot cleaner may rapidly return to the charger. When the virtual obstacle zone is employed, it may be possible to protect articles disposed beyond the virtual obstacle zone in accordance with user's desire because the virtual obstacle zone is not varied.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A robot cleaner comprising:
    a body to travel on a floor;
    an obstacle sensing unit to sense an obstacle approaching the body;
    an auxiliary cleaning unit mounted to a bottom of the body, the auxiliary cleaning unit being configured to be extendable outside of the body and retractable into the body; and
    a control unit to control the auxiliary cleaning unit when the obstacle is sensed,
    wherein the control unit is configured to recognize a zone of a charger and performs a control operation to prevent the auxiliary cleaning unit from extending when the body is in the charger zone.

2. The robot cleaner according to claim 1, wherein the control unit creates and stores a cleaning region map including information about a travel path of the body.

3. The robot cleaner according to claim 2, wherein the control unit designates a start position of the travel path of the body to a position of the charger in the cleaning region map, recognizes the charger zone based on the charger position designated in the cleaning region map, and performs a control operation to cause the body to travel while bypassing the charger zone.

4. The robot cleaner according to claim 1, wherein the control unit determines a charging state of the body.

5. The robot cleaner according to claim 4, wherein the control unit determines that the body is positioned at the charger zone when the body is in a charging state.

6. The robot cleaner according to claim 4, wherein the controller determines that the body is positioned at the charger zone for a predetermined time, when the body travels backward after completion of charging.

7. The robot cleaner according to claim 1, further comprising:
    a signal sensing unit to sense a signal transmitted from the charger,
    wherein the control unit recognizes the charger zone based on the signal, and performs a control operation to cause the body to travel while bypassing the charger zone.

8. The robot cleaner according to claim 7, wherein the signal is a signal to guide travel of the body toward the charger, for docking of the body with the charger.

9. The robot cleaner according to claim 8, wherein the signal comprises at least one of an infrared signal, an ultrasonic signal and a laser signal, which are forwardly or laterally transmitted from the charger within a predetermined angular range.

10. The robot cleaner according to claim 8, wherein the signal is divided into two signals, which overlap each other and have different ranges or different intensities.

11. The robot cleaner according to claim 7, wherein the signal forms, as the charger zone, a zone having a predetermined curved surface at a front or lateral side of the charger.

12. The robot cleaner according to claim 11, wherein the signal comprises at least one of an infrared signal, an ultrasonic wave signal and a laser signal, each of which forms a signal zone having a predetermined curved surface at the front or lateral side of the charger.

13. The robot cleaner according to claim 11, wherein the signal is divided into two signals, which overlap each other and have different ranges or different intensities.

14. The robot cleaner according to claim 7, wherein the control unit determines that the body is positioned at the charger zone, when the signal is sensed in a stopped state of the body.

15. The robot cleaner according to claim 7, wherein the control unit creates and stores a cleaning region map including information about a travel path of the body, designates a position, from which the signal is transmitted, to a position of the charger in the cleaning region map, recognizes the charger zone based on the charger position designated in the cleaning region map, and performs a control operation to cause the body to travel while bypassing the charger zone.

* * * * *